(12) United States Patent
Shultz et al.

(10) Patent No.: US 12,486,844 B2
(45) Date of Patent: Dec. 2, 2025

(54) ROTOR STATOR PUMP

(71) Applicant: Graco Minnesota Inc., Minneapolis, MN (US)

(72) Inventors: Mark D. Shultz, Ham Lake, MN (US); Joshua D. Roden, Dayton, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 18/703,555

(22) PCT Filed: Oct. 24, 2022

(86) PCT No.: PCT/US2022/047595
§ 371 (c)(1),
(2) Date: Apr. 22, 2024

(87) PCT Pub. No.: WO2023/076176
PCT Pub. Date: May 4, 2023

(65) Prior Publication Data
US 2025/0237214 A1 Jul. 24, 2025

Related U.S. Application Data

(60) Provisional application No. 63/271,268, filed on Oct. 25, 2021.

(51) Int. Cl.
*F04C 2/107* (2006.01)
*F04C 15/00* (2006.01)
(Continued)

(52) U.S. Cl.
CPC ............ *F04C 2/1071* (2013.01); *F04C 2/107* (2013.01); *F04C 2/1076* (2013.01);
(Continued)

(58) Field of Classification Search
CPC ...... F04C 2/1071–1078; F04C 18/1075; F04C 15/008; F01C 1/101
See application file for complete search history.

(56) References Cited

U.S. PATENT DOCUMENTS 3,271,081 A * 9/1966 Huddleston ........... F04C 2/1073
418/48
3,479,960 A 11/1969 Cardoso
(Continued)

FOREIGN PATENT DOCUMENTS

| DE | 3621967 A1 | 1/1988 |
|----|------------|--------|
| JP | S63302189 A | 12/1988 |
| WO | 2017154023 A1 | 9/2017 |

OTHER PUBLICATIONS

International Preliminary Report on Patentability for PCT Application No. PCT/US2022/047595, Dated May 10, 2024, pp. 14.
(Continued)

*Primary Examiner* — Laert Dounis
(74) *Attorney, Agent, or Firm* — Kinney & Lange, P.A.

(57) ABSTRACT

A rotor stator pump includes a rotating helical component and a static helical component. An electric motor is connected to the rotating helical component to drive rotation of the rotating helical component. The rotating helical component and the static helical component are disposed radially inward of the motor rotor of the electric motor.

20 Claims, 13 Drawing Sheets

(51) Int. Cl.
    *F04C 15/06* (2006.01)
    *H02K 21/14* (2006.01)
(52) U.S. Cl.
    CPC ............ *F04C 15/008* (2013.01); *F04C 15/06* (2013.01); *H02K 21/14* (2013.01); *F04C 2240/10* (2013.01); *F04C 2240/20* (2013.01); *F04C 2240/40* (2013.01)

(56) References Cited

U.S. PATENT DOCUMENTS

| | | | | |
|---|---|---|---|---|
| 3,804,561 | A | * | 4/1974 | Kramer ................. F04C 2/3441 418/175 |
| 5,505,594 | A | | 4/1996 | Sheehan |
| 8,388,327 | B2 | | 3/2013 | Ree |
| 8,622,689 | B2 | * | 1/2014 | Akamatsu ........... F04C 15/0057 415/72 |
| 2005/0008509 | A1 | * | 1/2005 | Chang ................... F04C 15/008 417/410.3 |
| 2010/0092317 | A1 | | 4/2010 | Suhara et al. |
| 2019/0249526 | A1 | | 8/2019 | Martinez |

OTHER PUBLICATIONS

International Search Report and Written Opinion for PCT Application No. PCT/US2022/047595, Dated Mar. 24, 2023, pp. 21.
Invitation to Pay Additional Fees for PCT Application No. PCT/US2022/047595, Dated Feb. 3, 2023, pp. 18.

* cited by examiner

ROTOR STATOR PUMP

CROSS-REFERENCE TO RELATED APPLICATION(S)

This application is a 371 national phase application of International Application No. PCT/US22/47595, which claims priority to U.S. Provisional Application No. 63/271,268 filed Oct. 25, 2021 and entitled "ROTOR STATOR PUMP," the disclosures of which are hereby incorporated by reference in their entireties.

BACKGROUND

This disclosure relates generally to pumps. More specifically, this disclosure relates to rotor stator pumps.

Rotor stator pumps, which can also be referred to as progressive cavity (PC) pumps, include a pump rotor that rotates relative to a pump stator to displace material through the pump. A helical shaft is disposed within a lobed sleeve and relative rotation therebetween moves the material through the pump.

SUMMARY

According to an aspect of the disclosure, a pump includes an electric motor including a motor rotor configured to rotate on an axis and a motor stator disposed around the motor rotor to electromagnetically drive rotation of the motor rotor; a pump stator disposed radially inward of the electric motor; and a helical rotor rod disposed at least partially within the pump stator, the helical rotor rod configured to rotate relative to the pump stator to form a series of progressing cavities to drive material along a cavity channel of the pump stator, the helical rotor rod connected to the electric motor to be rotated by the electric motor.

According to an additional or alternative aspect of the disclosure, a pump includes a pump body; an electric motor disposed within the pump body, the electric motor including a motor rotor configured to rotate on an axis and a motor stator disposed around the motor rotor to electromagnetically drive rotation of the motor rotor; a pump channel extending through the pump body to define a flowpath for material to flow between the electric motor and between a pump inlet and a pump outlet; a pump stator disposed radially inward of the electric motor; a helical rotor rod disposed at least partially within the pump stator, the helical rotor rod configured to rotate relative to the pump stator to form a series of progressing cavities to pump the material; an outer drive extending axially outward from the electric motor in a first axial direction along the axis, the outer drive configured to rotate on the pump axis; and an inner drive connected to the outer drive to be rotated by the outer drive, the inner drive extending in a second axial direction opposite the first axial direction, the inner drive including an inwardly projecting support connected to the outer drive and extending towards the pump axis to axially overlap with the helical rotor rod. The inner drive is connected to the helical rotor rod to drive rotation of the helical rotor rod.

According to another additional or alternative aspect of the disclosure, a pump includes a pump body; an electric motor disposed within the pump body, the electric motor including a motor rotor configured to rotate on an axis and a motor stator disposed around the motor rotor to electromagnetically drive rotation of the motor rotor; a pump stator disposed radially inward of the electric motor; a helical rotor rod disposed at least partially within the pump stator, the helical rotor rod configured to rotate relative to the pump stator to form a series of progressing cavities to pump material; an outer drive extending axially outward from the electric motor in a first axial direction along the axis, the outer drive configured to rotate on the pump axis; and an inner drive connected to the outer drive to be rotated by the outer drive, the inner drive extending in a second axial direction opposite the first axial direction. The inner drive is connected to the helical rotor rod to drive rotation of the helical rotor rod.

According to yet another additional or alternative aspect of the disclosure, a pump includes a pump body; an electric motor disposed within the pump body, the electric motor including a motor rotor configured to rotate on an axis and a motor stator disposed around the motor rotor to electromagnetically drive rotation of the motor rotor; a pump channel extending through the pump body to define a flowpath for material to flow between the electric motor and between a pump inlet and a pump outlet; an end adaptor connected to the motor rotor to be rotated by the motor rotor; a helical rotor rod, the helical rotor rod connected to the end adaptor to be rotated by the end adaptor; and a pump stator disposed around the helical rotor rod, the helical rotor rod extending into the pump stator and configured to rotate relative to the pump stator to form a series of progressing cavities to pump the material. The pump channel extends through the end adaptor such that the material flows within the end adaptor.

According to yet another additional or alternative aspect of the disclosure, a pump includes a pump body; an electric motor disposed within the pump body, the electric motor including a motor rotor configured to rotate on an axis and a motor stator disposed around the motor rotor to electromagnetically drive rotation of the motor rotor; a pump channel extending through the pump body to define a flowpath for material to flow between the electric motor and between a pump inlet and a pump outlet; a pump stator disposed radially inward of the electric motor; a helical rotor rod disposed at least partially within the pump stator, the helical rotor rod configured to rotate relative to the pump stator to form a series of progressing cavities to pump the material; an outer drive configured to be rotated on the axis by the electric motor; and an inner drive connected to the outer drive to be rotated by the outer drive. The inner drive is connected to the helical rotor rod to drive rotation of the helical rotor rod. The pump channel extends through the outer drive such that the material flows within the outer drive. The inner drive is disposed in the pump channel.

According to yet another additional or alternative aspect of the disclosure, a pump includes a pump body; an electric motor disposed within the pump body, the electric motor including a motor rotor configured to rotate on an axis and a motor stator disposed around the motor rotor to electromagnetically drive rotation of the motor rotor; a pump channel extending through the pump body to define a flowpath for material to flow between the electric motor and between a pump inlet and a pump outlet; a pump stator disposed radially inward of the electric motor; a helical rotor rod disposed at least partially within the pump stator, the helical rotor rod configured to rotate relative to the pump stator to form a series of progressing cavities to pump the material; an outer drive configured to be rotated on the axis by the electric motor; and an inner drive connected to the outer drive to be rotated by the outer drive, the inner drive connected to the helical rotor rod to drive rotation of the helical rotor rod. The pump channel extending through the outer drive such that the material flows within the outer drive. The outer drive includes a drive opening through which the material can enter into the outer drive. The outer drive includes a funnel that directs the material inward towards the pump axis, the funnel disposed axially between the drive inlet and a pump interface between the helical rotor rod and the pump stator.

According to yet another additional or alternative aspect of the disclosure, a pump includes a pump body; an electric motor disposed within the pump body, the electric motor including a motor rotor configured to rotate on an axis and a motor stator disposed around the motor rotor to electromagnetically drive rotation of the motor rotor; a pump channel extending through the pump body and the electric motor to define a flowpath for material to flow between a pump inlet and a pump outlet; a helical rotor rod; a pump stator disposed around the helical rotor rod, the helical rotor rod extending into the pump stator and configured to rotate relative to the pump stator to form a series of progressing cavities to pump the material; an end adaptor connected to the motor rotor to be rotated by the motor rotor; an inwardly projecting support connected to the end adaptor to rotate with the end adaptor, the inwardly projecting support extending towards the pump axis; and a drive link extending between the inwardly projecting support and the helical rotor rod to transmit torque from the inwardly projecting support to the helical rotor rod. The pump channel extends through the end adaptor such that the material flows within the end adaptor and such that the inwardly projecting support and drive link are disposed in the pump channel to be exposed to the material.

According to yet another additional or alternative aspect of the disclosure, a pump includes a pump body having a pump housing, a first end plate connected to a first end of the pump housing and a second end plate connected to a second end of the pump housing; an electric motor disposed within the pump body, the electric motor including a motor rotor configured to rotate on an axis and a motor stator disposed around the motor rotor to electromagnetically drive rotation of the motor rotor; a pump channel extending through the pump body and the electric motor to define a flowpath for material to flow between a pump inlet and a pump outlet; a pump stator disposed radially inward of the electric motor; a helical rotor rod disposed at least partially within the pump stator, the helical rotor rod configured to rotate relative to the pump stator to form a series of progressing cavities to pump the material; an outer drive configured to be rotated on the axis by the electric motor; and an inner drive connected to the outer drive to be rotated by the outer drive, the inner drive connected to the helical rotor rod to drive rotation of the helical rotor rod. The outer drive radially overlaps with the inner drive.

According to yet another additional or alternative aspect of the disclosure, a pump includes a pump body comprising a motor housing and a first end cover mounted to a first axial end of the motor housing; an electric motor disposed within the pump body, the electric motor including a motor rotor configured to rotate on an axis and a motor stator disposed around the motor rotor to electromagnetically drive rotation of the motor rotor; a pump channel extending through the pump body and the electric motor to define a flowpath for material to flow between a pump inlet and a pump outlet; a pump stator disposed radially inward of the electric motor and supported by the pump body; a helical rotor rod extending into the pump stator and configured to rotate relative to the pump stator to form a series of progressing cavities to pump the material; and an end adaptor connected to the motor rotor to be rotated by the motor rotor, wherein the end adaptor is at least partially disposed within the first end cover to rotate within the first end cover. The pump channel extends through the end adaptor such that the material flows within the end adaptor.

According to yet another additional or alternative aspect of the disclosure, a pump includes a pump body; an electric motor disposed within the pump body, the electric motor including a motor rotor configured to rotate on an axis and a motor stator disposed around the motor rotor to electromagnetically drive rotation of the motor rotor; a pump channel extending through the pump body and the electric motor to define a flowpath for material to flow between a pump inlet and a pump outlet; a pump stator disposed radially inward of the electric motor and supported by the pump body; a helical rotor rod extending into the pump stator and configured to rotate relative to the pump stator to form a series of progressing cavities to pump the material; an end adaptor connected to the motor rotor to be rotated by the motor rotor; a first dynamic seal interfacing with the end adaptor; and a second dynamic seal interfacing with the end adaptor.

According to yet another additional or alternative aspect of the disclosure, a pump includes a pump body; an electric motor disposed within the pump body, the electric motor including a motor rotor configured to rotate on an axis and a motor stator disposed around the motor rotor to electromagnetically drive rotation of the motor rotor; a pump channel extending through the pump body and the electric motor to define a flowpath for material to flow between a pump inlet and a pump outlet; a pump stator disposed radially inward of the electric motor, the pump stator includes a stator case and a stator sleeve disposed at least partially within the stator case, the stator sleeve defining a cavity channel; a helical rotor rod disposed at least partially within the stator sleeve, the helical rotor rod configured to rotate relative to the stator sleeve to form a series of progressing cavities to pump the material; an outer drive configured to be rotated on the axis by the electric motor; and an inner drive connected to the outer drive to be rotated by the outer drive, the inner drive connected to the helical rotor rod to drive rotation of the helical rotor rod.

According to yet another additional or alternative aspect of the disclosure, a pump includes a pump body; an electric motor disposed within the pump body, the electric motor including a motor rotor configured to rotate on an axis and a motor stator disposed around the motor rotor to electromagnetically drive rotation of the motor rotor; a pump stator disposed radially inward of the electric motor; and a helical rotor rod. The pump stator includes a stator case having a case flange disposed at a first case end of the stator case, the case flange fixed to the pump body to hold the stator case stationary relative to the stator case; and a stator sleeve disposed at least partially within the stator case, the stator sleeve defining a cavity channel. The helical rotor rod is disposed at least partially within the stator sleeve, the helical rotor rod configured to rotate relative to the stator sleeve to form a series of progressing cavities to pump the material, the helical rotor rod connected to the electric motor to be rotated by the electric motor.

According to yet another additional or alternative aspect of the disclosure, a pump includes a pump body; an electric motor disposed within the pump body, the electric motor including a motor rotor configured to rotate on an axis and a motor stator disposed around the motor rotor to electromagnetically drive rotation of the motor rotor; a pump stator disposed radially inward of the electric motor; a helical rotor rod; an outer drive configured to be rotated on the axis by the electric motor; an inner drive connected to the outer drive to be rotated by the outer drive, the inner drive connected to the helical rotor rod to drive rotation of the helical rotor rod; and a dynamic seal. The pump stator includes a stator case fixed to the pump body to hold the stator case stationary relative to the stator case; and a stator sleeve disposed at least partially within the stator case, the stator sleeve defining a cavity channel. The helical rotor rod is disposed at least partially within the stator sleeve, the helical rotor rod configured to rotate relative to the stator sleeve to form a series of progressing cavities to pump the material, the helical rotor rod connected to the electric motor to be rotated by the electric motor. The dynamic seal is disposed between and engaging the stator case and the outer drive.

According to yet another additional or alternative aspect of the disclosure, a pump includes a pump body; an electric motor disposed within the pump body, the electric motor including a motor rotor configured to rotate on an axis and a motor stator disposed around the motor rotor to electromagnetically drive rotation of the motor rotor; a pump stator disposed radially inward of the electric motor; a helical rotor rod; an outer drive configured to be rotated on the axis by the electric motor; and an inner drive connected to the outer drive to be rotated by the outer drive, the inner drive connected to the helical rotor rod to drive rotation of the helical rotor rod. The pump stator includes a stator case fixed to the pump body to hold the stator case stationary relative to the stator case, the stator case disposed radially within the electric motor and spaced radially inward of the motor rotor such that an air gap is disposed annularly around the stator case radially between the stator case and the motor rotor; and a stator sleeve disposed at least partially within the stator case, the stator sleeve defining a cavity channel. The helical rotor rod is disposed at least partially within the stator sleeve, the helical rotor rod configured to rotate relative to the stator sleeve to form a series of progressing cavities to pump the material;

According to yet another additional or alternative aspect of the disclosure, a pump includes a pump body; an electric motor disposed within the pump body, the electric motor including a motor rotor configured to rotate on an axis and a motor stator disposed around the motor rotor to electromagnetically drive rotation of the motor rotor; a pump stator disposed radially inward of the electric motor; and a helical rotor rod. The pump stator includes a stator case fixed to the pump body to hold the stator case stationary relative to the stator case; and a stator sleeve disposed at least partially within the stator case, the stator sleeve defining a cavity channel. The stator case includes a sleeve support body; and a brace shoulder disposed at an end of the sleeve support body. The stator sleeve axially engages with the brace shoulder. The helical rotor rod is disposed at least partially within the stator sleeve, the helical rotor rod configured to rotate relative to the stator sleeve to form a series of progressing cavities to pump the material.

According to yet another additional or alternative aspect of the disclosure, a pump includes a pump body having a motor housing, a first end cover connected to a first end of the motor housing, and a second end cover connected to a second end of the motor housing, wherein a pump inlet is formed in the first end cover; an electric motor disposed within the motor housing; a pump stator disposed radially inward of the electric motor; a helical rotor rod disposed at least partially within the pump stator, the helical rotor rod configured to rotate relative to the pump stator to pump material; an outer drive configured to be rotated on a pump axis by the electric motor; an inner drive connected to the outer drive to be rotated by the outer drive, the inner drive connected to the helical rotor rod to drive rotation of the helical rotor rod; and an agitator connected to the inner drive to be rotated by the inner drive, the agitator extending in a first axial direction along a pump axis from the inner drive and the helical rotor rod extending in a second axial direction along the pump axis from the inner drive, the second axial direction opposite the first axial direction.

According to yet another additional or alternative aspect of the disclosure, a pump includes a pump body; a hopper mounted to the pump body; an electric motor disposed within the pump body, the electric motor including a motor rotor configured to rotate on an axis and a motor stator disposed around the motor rotor to electromagnetically drive rotation of the motor rotor; a pump stator disposed radially inward of the electric motor; a helical rotor rod disposed at least partially within the pump stator, the helical rotor rod configured to rotate relative to the pump stator to pump material; an outer drive configured to be rotated on the axis by the electric motor; an inner drive connected to the outer drive to be rotated by the outer drive, the inner drive connected to the helical rotor rod to drive rotation of the helical rotor rod; an agitator connected to the inner drive to be rotated by the inner drive, the agitator extending out of the pump body and into the hopper. The agitator extends in a first axial direction from the inner drive and the helical rotor rod extends in a second axial direction from the inner drive, the second axial direction opposite the first axial direction.

According to yet another additional or alternative aspect of the disclosure, a pump includes a pump body; a hopper mounted to the pump body; an electric motor disposed within the pump body, the electric motor including a motor rotor configured to rotate on an axis and a motor stator disposed around the motor rotor and spaced from the motor rotor by a motor air gap, the motor stator configured to electromagnetically drive rotation of the motor rotor; a pump stator disposed radially inward of the electric motor such that a pump air gap is disposed radially between the pump stator and the motor rotor; and a helical rotor rod disposed at least partially within the pump stator, the helical rotor rod connected to the motor rotor to be rotatably driven by motor rotor to rotate relative to the pump stator to pump material.

According to yet another additional or alternative aspect of the disclosure, a pump includes an electric motor; a pump rotor located radially within the electric motor, the pump rotor driven by the electric motor to make continuous rotations; and a helical stator rod located within the pump rotor.

According to yet another additional or alternative aspect of the disclosure, a pump for pumping a material includes a motor rotor configured to rotate about an axis; a motor stator configured to electromagnetically drive rotation of the motor rotor about the axis; a pump stator fixable in position relative to the motor stator; and a pump rotor radially overlapping at least partially with the pump stator, the helical rotor configured to rotate relative to the pump stator to form a series of progressing cavities together with the pump stator to drive material, the pump rotor connected to the motor rotor to be rotated about the axis by the motor rotor. The material travels along the axis radially within and through each of the motor rotor, the motor stator, the pump stator, and the pump rotor.

DETAILED DESCRIPTION

Figure 1A:
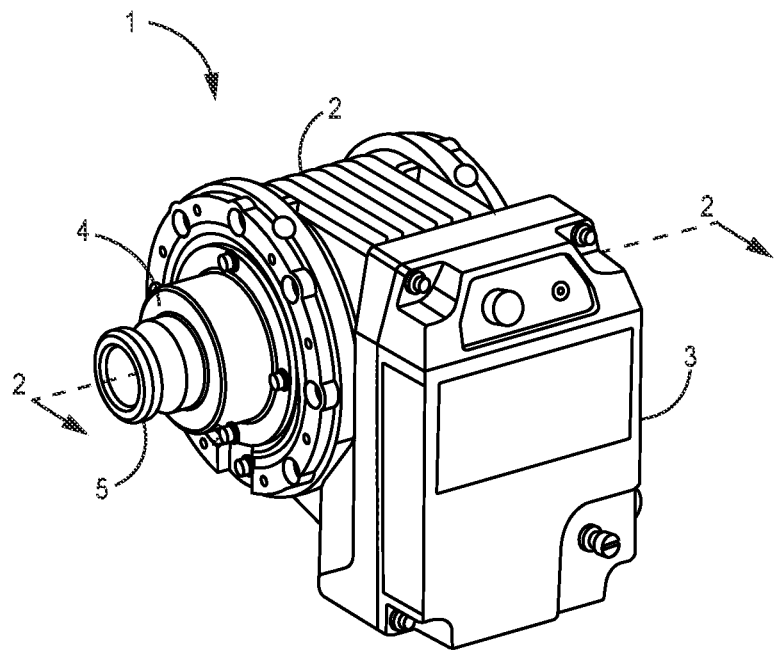
FIG. 1A is a first isometric view of a pump.

The present disclosure relates to rotor stator pumps. Rotor stator pumps includes a helical rotating component that rotates relative to a helical stator component. The relative rotation creates a series of pockets that progress through the pump to pump the material. The rotor stator pumps according to the disclosure are powered by an electric motor that is operatively connected to the helical rotating component to drive rotation of the helical rotating component. The helical rotating component and the helical stator component are disposed radially inward of the electric motor. In some examples, the electric motor is disposed around one or both of the helical components. The helical components can be disposed within the electric motor such that a radial line extending from a rotational axis extends through the rotating helical component, the static helical component, and the electric motor. The material flow through the pump can flow through the electric motor.

The rotor stator pump can include an outer rotator that is connected to the electric motor, or can be formed at least partially by the electric motor, and that transmits torque from the electric motor. The outer drive is connected to an inner drive that is connected to the helical rotating component to drive rotation of the helical rotating component. The outer drive can extend axially outward of the helical stator component to connect to the inner drive. The inner drive can extend back towards the electric motor and within the outer drive to connect to the helical rotating component.

The rotor stator pump can include a rotating tube that is driven by the electric motor and that transmits rotational energy to the helical rotating component. The torque is transmitted from the rotating tube to the helical rotating component. The rotating tube defines a portion of the flowpath through the pump such that pumped material flows within and through the rotating tube. The rotating tube can connect to a crossbar that is disposed in the material flowpath through the pump, the crossbar connected to the helical rotating component to transmit torque to the rotating helical component.

The rotating tube of the pump can be disposed on a low pressure side of the pump, upstream of the pump interface between the helical rotating component and the helical stator component. The rotating tube is disposed upstream of the pump interface such that pumped material flows through the rotating tube prior to flowing to the pump interface to be acted on by the helical components. The rotating tube can be disposed within a static tube that forms a portion of the flowpath through pump. A static component of the pump, such as a case supporting the helical stator, can extend into the rotating tube. The static component can form another tube through which the pumped material flows.

The rotor stator pump can include a funnel that directs material radially inward towards a rotational axis prior to the material entering into the pump interface between the helical rotating component and the helical stator component. The funnel can be formed by a rotating portion of the pump.

Dynamic seals can engage with rotating components of the rotor stator pump. The dynamic seals can be disposed solely on the low pressure, upstream side of the pump. The rotating components of the pump that transmit torque to the helical rotating component can, in some examples, engage with multiple dynamic seals. The dynamic seals can be stationary such that the rotating components rotate relative to the dynamic seals, the dynamic seals can be supported by the rotating components such that the dynamic seals rotate with the rotating components, or multiple dynamic seals can be mounted such that one or more of the dynamic seals rotate and one or more of the dynamic seals remains stationary. Some examples of the rotor stator pump include multiple dynamic seals engaging with the rotating components. For example, a first dynamic seal can engage with an interior of the rotating components and a second dynamic seal can engage with an exterior of the rotating components.

The helical stator component can be formed from compliant material (e.g., rubber) and can be supported by a static case. The static case is stationary. The helical rotating component can extend into the helical stator component, in some examples, such that the helical rotating component is disposed radially inward of the static case. As such, the static case can include a rotating helical component within the static case while the motor rotor of the motor rotates radially outward of the static case.

The helical stator component can be clamped to the static case to maintain the static helical stator component stationary while the helical rotating component rotates relative to the helical stator component. One axial end of the helical stator component can engage with a shoulder of the static case to be clamped against the shoulder.

The helical stator component can be disposed radially within the electric motor. The static case supporting the helical stator component can similarly be disposed within the electric motor. An air gap can be formed annularly around the static case and radially between the static case and the motor rotor of the electric motor.

The static case can be fixed at only one end to a pump body while the other end of the static case is dynamically supported by a bearing. The fixed end of the static case can be an opposite axial end of the static case from the end of the static case though which the pumped material initially enters into the static case.

The static case can interface with a dynamic seal that is either supported by the static case to remain stationary or supported by rotating components of the pump to rotate relative to the static case.

The helical stator component can be removed and replaced for another helical stator component to change a displacement of the pump. The helical stator component can be swapped for another helical stator component having a different length, channel width, etc. The helical rotating component can similarly be removed and replaced with another helical rotating component that is configured to mate with the other helical stator component.

The rotor stator pump can include a powered takeoff (PTO) that assists in feeding material into the pump. The PTO is connected to the rotating components of the pump. The PTO is connected to rotating components of the pump to be rotated by the rotating components. Torque is transmitted to the PTO by the rotating components. The torque transmitted to the PTO is not transmitted through the helical rotating component.

Several of the figures of the disclosure show an axis AA, which is sometimes referred to as a motor axis, common axis, pump axis or axis of rotation. An axis of rotation of the rotor is disposed coaxially with the axis AA. The term annular is used herein, which can refer to a ring shape (continuous or broken) about the axis AA. The term radial is used herein which when referring to a direction is any direction away from the axis AA, unless otherwise noted. The radial direction can be orthogonal to the axis AA. The term axial is used herein which when referring to a direction is any direction along the axis AA, unless otherwise noted. The axial direction can be parallel to the axis AA. The terms circumferential or circumferentially as used herein means around the axis AA, unless otherwise noted.

Components can be considered to radially overlap when those components are disposed at common axial locations along axis AA. A radial line extending orthogonally from axis AA will extend through each of the radially overlapping components. Components can be considered to axially overlap when those components are disposed at common radial and circumferential locations such that an axial line parallel to axis AA extends through the axially overlapping components. Components can be considered to circumferentially overlap when aligned about axis AA, such that a circle centered on axis AA passes through the circumferentially overlapping components.

Figure 1B:
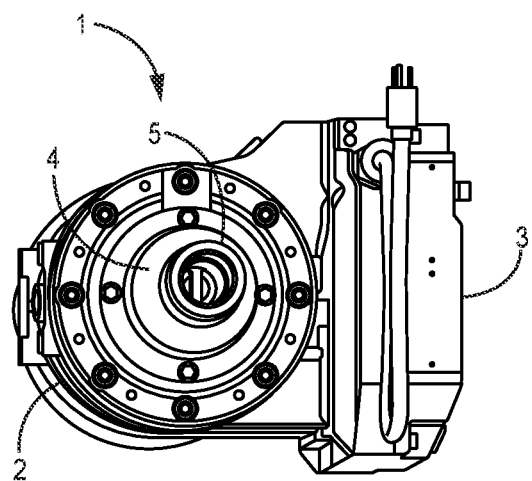
FIG. 1B is a second isometric view of the pump.
Figure 1C:
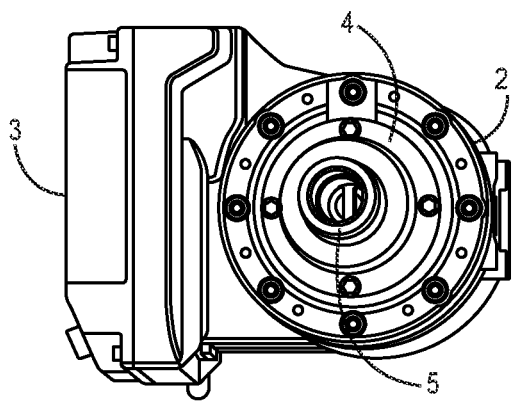
FIG. 1C is a third isometric view of the pump.

FIG. 1A is a first isometric view of pump 1. FIG. 1B is a second isometric view of pump 1. FIG. 1C is a third isometric view of pump 1. The pump 1 includes a pump housing 2. Attached to the pump housing 2, in this embodiment, is a control housing 3. It is noted that the control housing 3 can be separate from the pump housing 2 in various other embodiments. Extending from the sides of the pump housing are end covers 4. It is noted that one end cover 4 may be present in various embodiments, but the embodiments shown herein include dual end covers 4. The end covers 4 can be identical to each other or can be different as further shown herein. The end covers 4 in this embodiment each include a fitting 5. A hose or other component for routing a flow of fluid being pumped can attach to the fitting 5. For example, first hose can represent an inlet and a second hose can represent an outlet. Hoppers and other feed devices can be attached to an inlet one of fittings 5.

Figure 2:
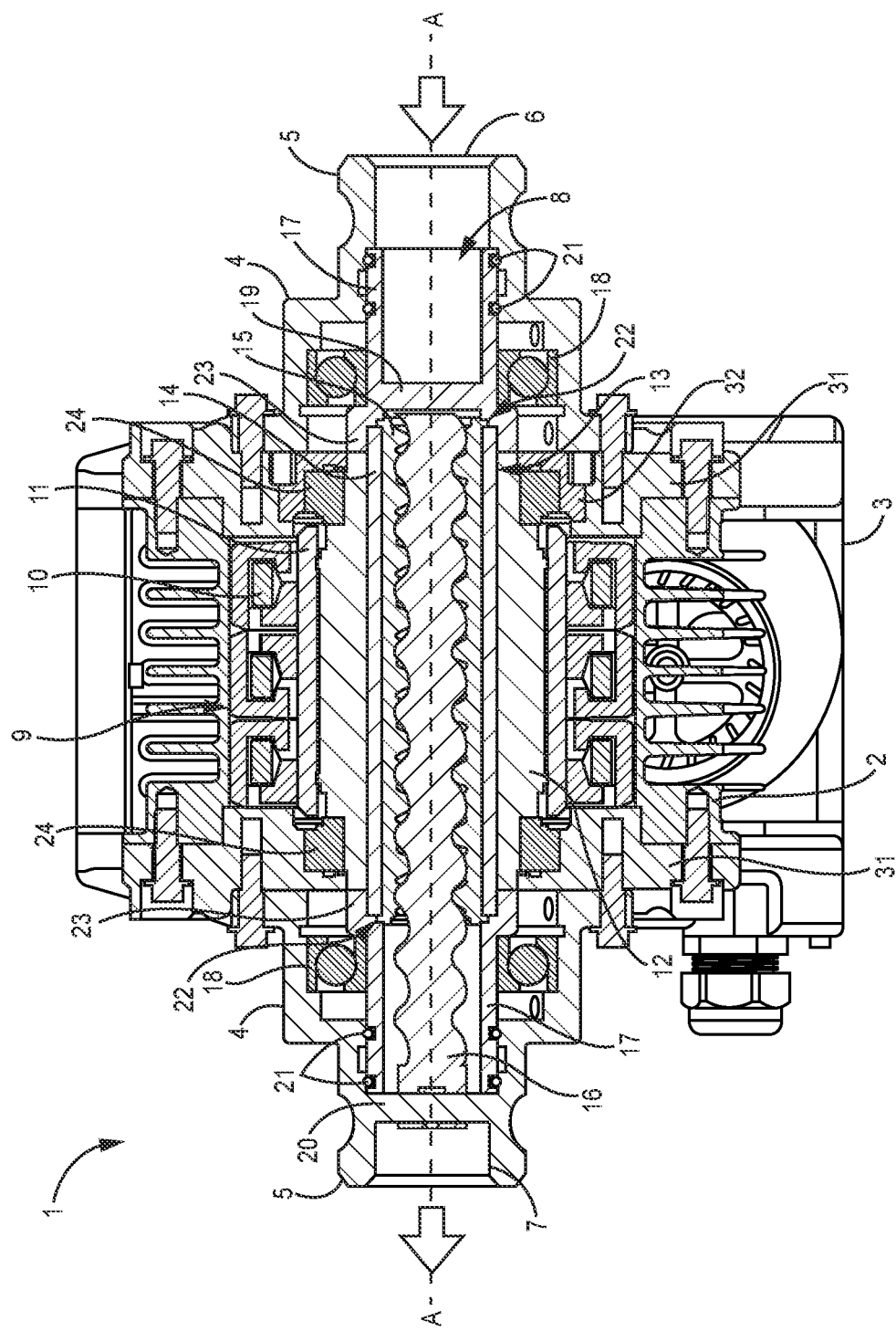
FIG. 2 is a cross-sectional view taken along line 2-2 in FIG. 1A.

FIG. 2 is a cross-sectional view of pump 1 taken along line 2-2 in FIG. 1A. As shown, the pump 1 includes in inlet 6 and an outlet 7. A channel 8 extends from the inlet 6 to the outlet 7. Fluid is pumped along this channel 8. The channel 8 is aligned along axis AA. The inlet 6 is formed by a first end cover 4. The outlet 7 is formed by a second end cover 4 different from the first end cover 4.

Mounted to the ends of the pump housing 2 are end plates 31. End plates 31 each have a central aperture. Mounted to each end plate 31 is an end cover 4. Mounted within the aperture of one of the end plates 31 is a retainer 32. Retainer 32 includes a central aperture. The end plate 31 that receives the retainer 32 has a larger aperture than the end plate 31 that does not receive the retainer 32. In the example shown, retainer 32 is mounted to the end plate 31 on the inlet side of pump 1. The inlet ones of end covers 4, through which fluid inlet 6 is formed, is mounted to the end plate 31 supporting retainer 32, in the example shown.

The retainer 32 can preload the bearings 24. Retainer 32 can also allow assembly of the receiver hub 12, and the bearings 24, within the motor 9 and pump housing 2. As shown, bolts fix the end plates 31 to the pump housing 2. Bolts also fix the end covers 4 to end plates 31.

Pump 1 includes a rotor stator pump that is coaxial with an electric motor. Both the fluid moving components of pump 1 and motor 9 are coaxial about the axis AA. Specifically, the rotor of the pump rotates coaxial about the axis AA and the rotor of the motor rotates about the axis AA, as further explained herein. It is noted that the pump rotor may have more degrees of freedom that just rotation such that the pump rotor can wiggle off center of the axis, particularly as the rubber of the pump 1 squeezes. As such, the motor rotor may rotates about an axis even if each rotation is not perfectly coaxial with the axis.

Motor 9 is partially or entirely contained within the pump housing 2. The motor 9 includes a motor stator 10. The motor stator 10 can include one or more coils for generating electromagnetic fields. The motor 9 includes a motor rotor 11. The motor rotor 11 can include magnets (e.g., permanent and/or electromagnets) that are driven to move by the electromagnetic fields generated by the motor stator 10 to rotate the motor rotor 11 relative to the motor stator 10. The motor stator 10 can be fixed to the pump housing 2, such as with potting material, such as epoxy.

Fixed to the motor rotor 11 is a receiver hub 12. The receiver hub 12 is radially within the motor rotor 11. In this embodiment, the receiver hub 12 extends axially beyond the motor 9, in both axial directions along pump axis AA. The receiver hub 12 is supported by bearings 24. Bearings 24 can be tapered roller bearings, amongst other options. A first bearing 24 is supported directly by a first end plate 31. A second bearing 24 is directly supported by retainer 32 that is supported by the second end plate 31. The receiver hub 12 includes steps or notches that receive the bearings 24. In this way, a radial thickness of the receiver hub 12 is greater at locations axially between the bearings 24 and narrower at locations axially aligned with or axially outside of the bearings 24.

The receiver hub 12 defines a cavity for receiving a rotor stator pump assembly. Specifically, pump rotor 13 is located within the cavity of the receiver hub 12. Pump rotor 13 directly contacts the receiver hub 12. Pump rotor 13 includes a case 14. Case 14 can be a metal tube. The case 14 can be keyed to the cavity of the receiver hub 12 such that the case 14 cannot freely rotate within the cavity of the receiver hub 12, and instead the case 14 rotates with the receiver hub 12. For example, the cavity of the receiver hub 12 could be faceted and the case 14 can be faceted in a complementary manner such that they are rotationally fixed when engaged. Such faceting could include polygonal (e.g., hexagonal or octagonal) surfaces engaging. In another example, the exterior of the case 14 can be threaded to engage complementary inner threading of the cavity of the receiver hub 12, such that relative rotation is resisted when the threading is engaged.

Receiver hub 12 extends axially beyond bearings 24. The receiver hub 12 may be potted to the motor rotor 11, such as with a matrix of epoxy which penetrates the motor rotor 10 and surrounds the receiver hub 12. It is noted that the receiver hub 12 rotationally fixes the pump rotor 13 but not the helical stator 16. The receiver hub 12 does not axially limit the travel of the pump rotor 13.

The case 14 contains rotor helical cavity sleeve 15. The rotor helical cavity sleeve 15 can define a helical cavity along the axis AA. The helical cavity may be a single helix or a double helix, amongst other options. The material that forms the rotor helical cavity sleeve 15 can be rubber (e.g., a polymer) or other compliant material. As shown, the rotor helical cavity sleeve 15 extends axially beyond the case 14.

Located partially within the rotor helical cavity sleeve 15 is helical stator rod 16. The helical stator rod 16 can be formed from a stiff material, such as metal. The helical stator rod 16 can be formed in the shape of the helix or other lobed structure. The helical stator rod 16 is complementary to the rotor helical cavity sleeve 15 such that relative rotation develops moving pockets to move fluid along the channel 8 in the manner of a progressive cavity pump. The helical stator rod 16 can be a single helix complementary to the double helix of the rotor helical cavity sleeve 15.

The helical stator rod 16 is kept in place by the inlet bracket 19 and outlet bracket 20. The inlet bracket 19 is not rigidly fixed to the helical stator rod 16 but blocks axial movement along the channel 8 by the helical stator rod 16, blocking the tendency for the helical stator rod 16 to move axially toward the inlet 6 due to interaction with the rotor helical cavity sleeve 15. The helical stator rod 16 is prevented from full rotations by interfacing with the outlet bracket 20. In this case, the helical stator rod 16 includes a slot which receives the outlet bracket 20 which in this case is a cross bar. Dimensioning between the outlet bracket 20 and the helical stator rod 16 allows some rotation of the helical stator rod 16 about the axis AA but not complete rotations. Specifically, the helical stator rod 16 is prevented from rotating 360-degrees but can rotate up to a limit that is less than 360-degrees. For example, the helical stator rod 16 can rotate less than 90-degrees but more than 10-degrees. In another example, the helical stator rod 16 can rotate less than 180-degrees but more than 5-degrees. It is understood that other rotational ranges are possible.

While the helical stator rod 16 is prevented from full rotations, the pump rotor 13 is driven by the motor 9 to make continuous full rotations about axis AA. In such operation, pump rotor 13 is rotated by the motor 9 continuously, either clockwise or counterclockwise, which rotates the helical cavity sleeve 15 around the helical stator rod 16. The helical stator rod 16 not being able to fully rotate creates and progresses pockets along the channel 8 between the helical stator rod 16 and the rotor helical cavity sleeve 15 to pump fluid from the inlet 6 to the outlet 7.

Rotating adapters 17, which can also be referred to as end adaptors, are disposed at the ends of the pump rotor 13. In the example shown, rotating adaptors 17 are formed separately from and mounted to the ends of pump rotor 13. The rotating adapters 17 rotate together with the pump rotor 13. While dual rotating adapters 17 are shown mounted on either ends of the pump rotor 13, only one of the rotating adapters 17 may be present in various embodiments. The rotating adapters 17 can perform various functions. The rotating adapters 17 bridge the flow of fluid being pumped from the rotating pump rotor 13 to the static inlet 6 and outlet 7 of the end covers 4. The end covers 4 do not rotate while the rotating adaptors 17 do rotate on the axis AA. The rotating adapters 17 are supported by bearings 18. In this embodiment, the bearings 18 engage the end covers 4 such that end covers 4 support bearings 18 while bearings 18 engaging the outer rotating surface of the rotating adapters 17 to rotatably support the rotating adaptors 17. As shown, the bearings 18 engage shoulders of the rotating adapters 17. The shoulders can be formed by flanges 23, however this may not be the case in all embodiments. In this embodiment, the flanges 23 fit around the ends of the pump rotor 13. Specifically, the flanges 23 include a widening interior surface which fits over the case 14 and the rotator helical cavity sleeve 15.

Static seals 22 are formed between the rotating adapters 17 and the pump rotor 13. Static seals 22 can be end seals that seal on the axial faces of the rotating adapters 17 and the pump rotor 13. Such sealing surfaces can be the axial faces of the rotating adapters 17 and one or both of the case 14 and the rotor helical cavity sleeve 15. It may be particularly advantageous to seal with the rotor helical cavity sleeve 15 because that material is flexible and is engineered for sealing with the helical stator rod 16. A radial seal may also be provided between the flanges 23 and the case 14. The static seals 22 can help contain the fluid being pumped, particularly avoiding leakage near the motor 9. Static seals 22 rotate with rotating adaptors 17 and pump rotor 13 but are formed as static seals in that rotating adaptors 17 and pump rotor 13 do not rotate relative to the static seals 22.

Dynamic seals 21 are formed between the exterior of the rotating adapters 17 and the interior of the end covers 4. Each dynamic seal 21 can be formed by an O-ring, however other options are possible. The seals 21 are dynamic in that the rotating adapters 17 rotate relative to the end cover 4. Seals 21 are dynamic in that a component engaging with and sealing with the seal 21 moves relative to the seal 21 during operation. As shown, an array of dynamic seals 21 are disposed along the axis AA to prevent leakage between the rotating adapters 17 and the end covers 4.

As shown, the helical stator rod 16 extends axially beyond one of the rotating adapters 17. In this embodiment, the helical stator rod 16 does not extend axially beyond the other rotating adapter 17. As shown, the helical stator rod 16 radially overlaps with both of the rotating adapters 17. In the example shown, stator rod 16 extends axially beyond the outlet ones of rotating adaptors 17 that is disposed on the downstream side of pump rotor 13.

As previously mentioned, the case 14 is keyed to the cavity of the receiver hub 12. Likewise, flanges 23 of the rotating adapters 17 can be keyed to the case 14 in the same manner (e.g., having complementary shapes as the cavity of the receiver hub 12). Keying rotating adaptors 17 to case 14 prevents relative rotation therebetween.

The pump rotor 13 is prevented from axial movement within the receiver hub 12 by the rotating adapters 17. Specifically, the pair of rotating adapters 17 sandwich the pump rotor 13 therebetween to prevent axial movement of the pump rotor 13 relative to the receiver hub 12. Rotating adaptors 17 axially overlap with pump rotor 13 on both axial sides of pump rotor 13 to interface with pump rotor 13 and prevent axial movement of pump rotor 13 along axis AA. The rotating adapters 17 are in turn held axially in place by bearings 18 and/or end covers 4. As such, end covers 4 directly or indirectly hold the pump rotor 13 axially in place within the receiver hub 12.

Figure 3:
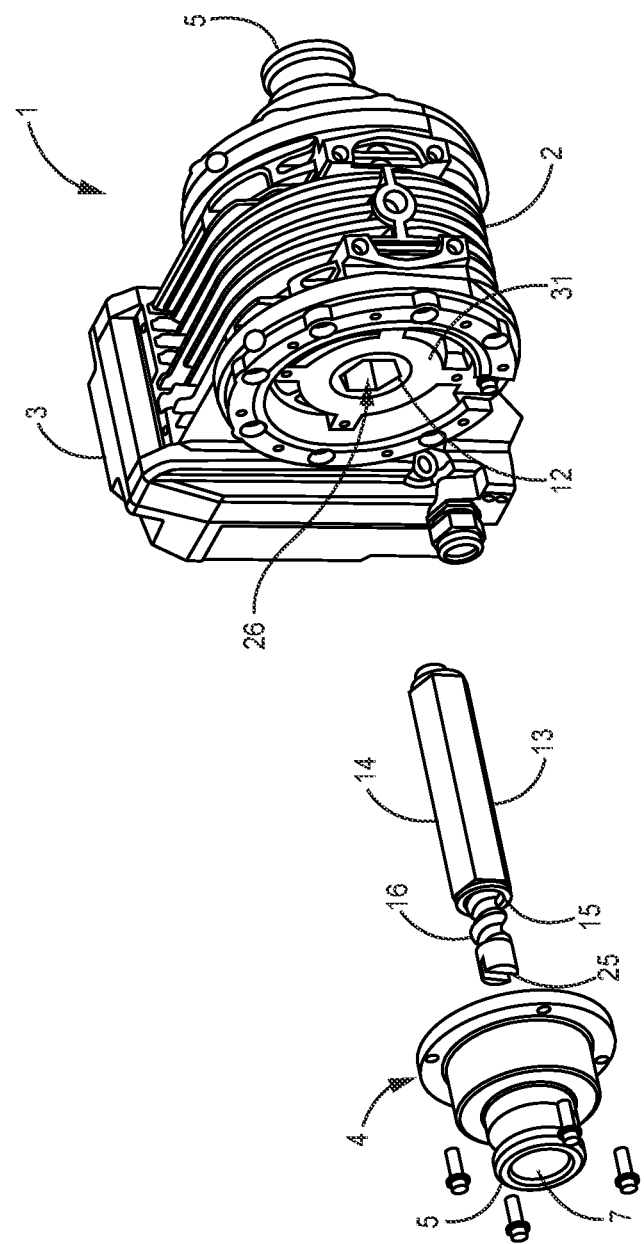
FIG. 3 is a first exploded isometric view of a pump.
Figure 4:
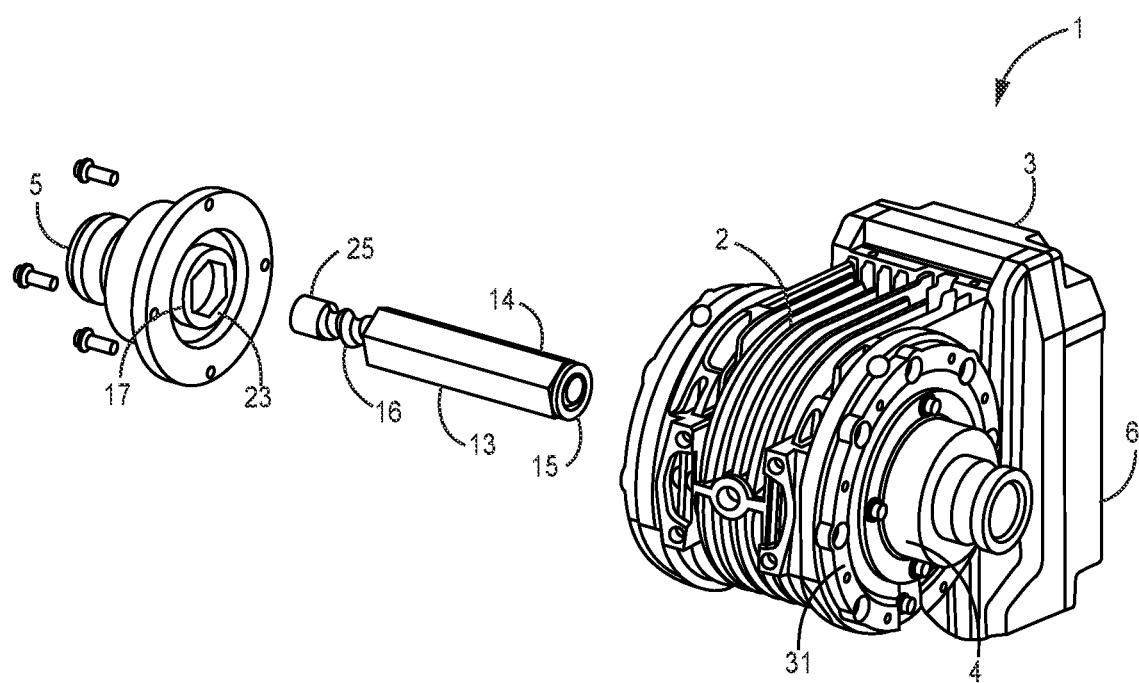
FIG. 4 is a second exploded isometric view of the pump.

FIG. 3 is a first partially exploded isometric view of pump 1. FIG. 4 is a second partially exploded isometric view of pump 1. FIGS. 3 and 4 will be discussed together. FIGS. 3 and 4 demonstrate removal of the pump rotor 13 and helical stator rod 16 from the pump housing 2, specifically from the cavity 26 of the receiver hub 12. Such removal can take place when an end cover 4 is dismounted. In the example shown, the downstream one of end covers 4 is removed to facilitate removal of pump rotor 13 and helical stator rod 16. Assuming the rotating adapter 17 is dismounted together with the end cover 4 or the rotating adapter 17 was removed separately, the pump rotor 13, containing the helical stator rod 16, can be slid out from the cavity 16. As shown, the cavity 16 is a hex shape while the case 14 is also a hex shape complementary to that of the cavity 16. Such complementary faceting prevents relative rotation therebetween. The pump rotor 13 can be slid back into the cavity 26 together with the helical stator rod 16 and the rotating adapters 17 and end cover 14 remounted to the pump housing 2 to reassemble the pump 1. In this way, the pump rotor 13 and/or helical stator rod 16 can be quickly serviced, such as for cleaning, inspection, and/or replacement. The pump rotor 13 and/or the helical stator rod 16 can be slid back into the cavity 26 from either end of the cavity 26, in either orientation of the pump rotor 13 and/or the helical stator rod 16.

In some examples, one of the pump rotor 13 or the helical stator rod 16 can be removed from the cavity 26 while the other remains in place, or can both can be removed together. For example, helical stator rod 16 can be withdrawn from pump rotor 13 while pump rotor 13 remains mounted within motor 9. In some examples, the pump rotor 13 can be flipped in orientation such that the end first removed from cavity 26 is the end first inserted into the cavity 26 to reverse the orientation of the pump rotor 13 and the helical stator rod 16. In such case, the rotating adapters 17 and end covers 4 can also be flipped sides relative to the pump housing 2. In such a way, the direction of pumping can be reversed so that different wear surfaces can be worn to extend overall life.

It is noted that the direction of rotation of the motor rotor 11 can be reversed based on the control setting. This can reverse the direction of pumping to help avoid packout or facilitate cleaning. Such reversal can also support swapping of orientation of the pump rotor 13, helical stator rod 16, rotating adapters 17, and end covers 4 as previously described.

Different sized pump rotors 13 and helical stator rod 16 can be inserted into the cavity 26. Therefore, an operator can change the size of the pump rotor 13 and helical stator rod 16 by exposing the cavity 26, removing the current pump rotor 13 and helical stator rod 16, and inserting a different size into the cavity 26, and reassembling. For particularly small cases 14, tube spacers can be placed between the interior the cavity 26 and the exterior of the case 14.

FIGS. 3 and 4 show the slot 25 within the helical stator rod 16. It is the interface between the slot 25 and the outlet bracket 20 which prevents full rotation of the helical stator rod 16 but allows some degree of rotation. The slot 25 is U-shaped to fit around the outlet bracket 20. The slot 25 is open on one end so that it can be freely axially moved off of the outlet bracket 20 but is blocked on the other end of the helical stator rod 16 by bracket 19.

It is noted, as shown in FIGS. 3 and 4, that the pump rotor 13 and helical stator rod 16 can be inserted from either end of the cavity 26 of the receiver hub 12, such that only one of the end covers 4 and rotating adapters 17 may need to be removed to swap the pump rotor 13 and the helical stator rod 16. Bearings 24 do not need to be removed to switch out the pump rotor 13 and/or the helical stator rod 16.

There can be slight play between the cavity 26 and the case 14. The slight play allows removal of the case 14 from inside the cavity 26. Such play also allows slight rotation of the case 14 about the axis AA during pumping. The rotating adapters 17, and bearings 18 that support them, mitigate any such wobble to support the sealing of dynamic seals 21.

Figure 5:
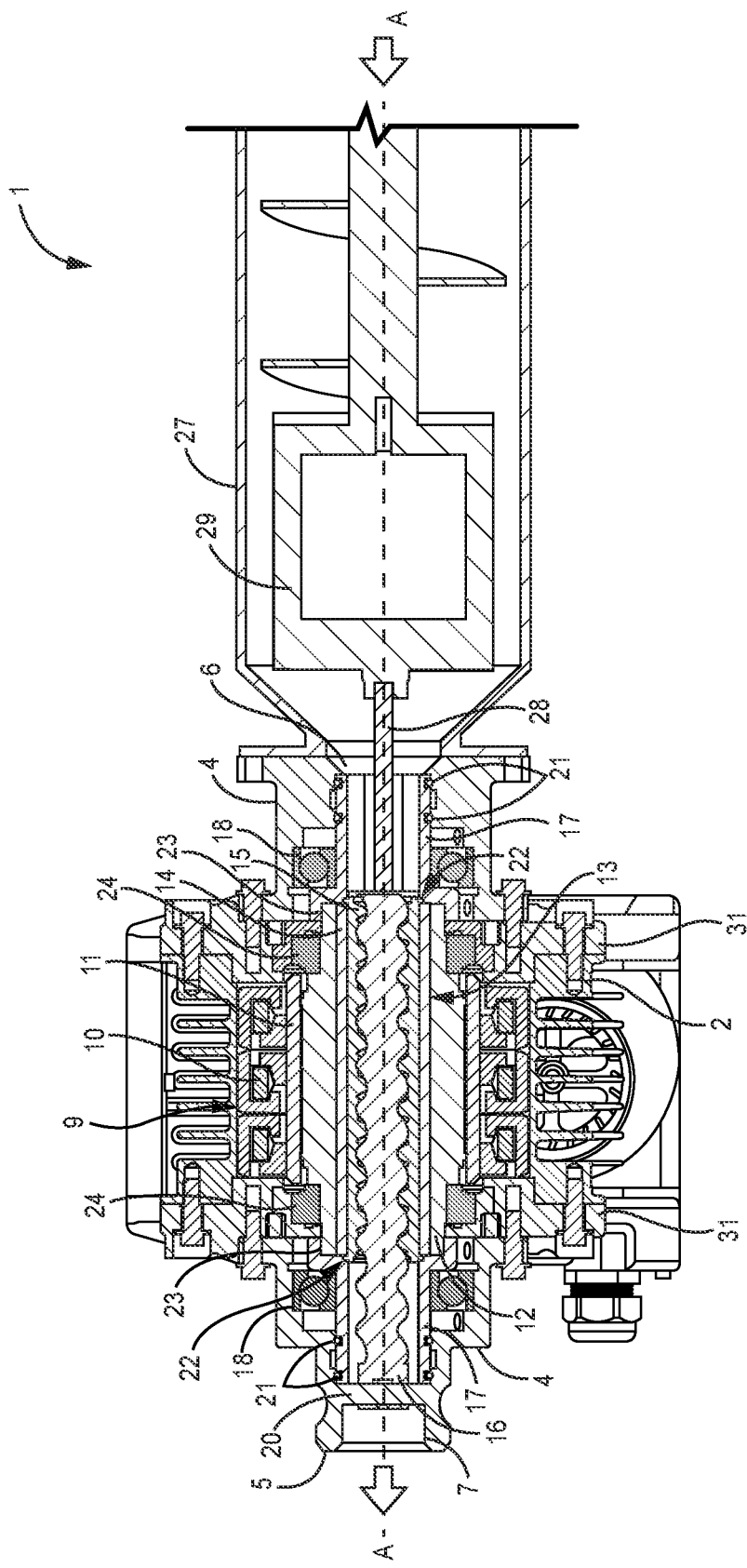
FIG. 5 is a cross-sectional view similar to FIG. 2 showing the pump connected to a powered takeoff assembly.
Figure 6:
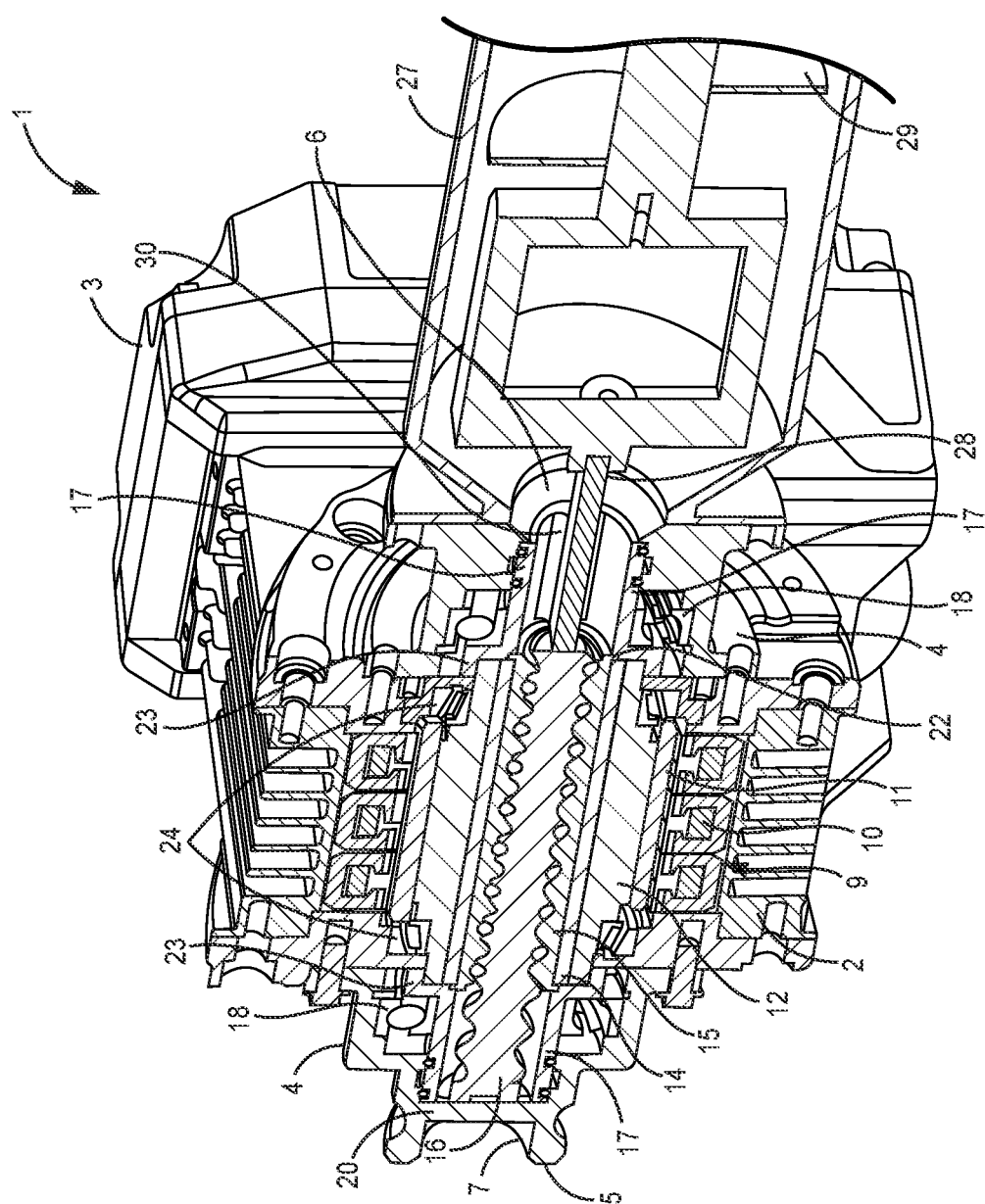
FIG. 6 is an isometric cross-sectional view similar to FIG. 5.

FIG. 5 is a cross-sectional view similar to FIG. 2 showing the pump connected to a powered takeoff assembly. FIG. 6 is an isometric cross-sectional view similar to FIG. 5. FIGS. 5 and 6 show a modified embodiment relative to the previous embodiment. All aspects can be the same, and the previous teachings apply to this embodiment as well, unless shown to be incompatible. Elements with common reference numbers will not be re-discussed, for brevity.

Many fluids that are pumped do not readily flow and need assistance with feeding into the inlet 6. This is due in part to rotor stator pumps not developing suction, unlike positive displacement pumps. Gravity is one way to assist with feeding, but still may not be enough for particularly viscous materials or when a horizontal orientation is needed. In such cases, a power feed into the inlet 6 may be needed. FIGS. 5 and 6 show such a power feed. The power feed can also be referred to as a powered takeoff (PTO).

The power feed includes an agitator 29 that rotates within feed housing 27. In some examples the feed housing 27 can be formed as a hopper that stores a supply of the material for pumping. The agitator 29 could be an auger and/or stirrer, amongst other options. For example, the agitator 29 can function to mix the material in some embodiments. For example, in various embodiments, the agitator 29 can function to push material toward the pump stator and pump rotor in the manner of a low pressure pump (i.e. agitator 29) feeding a higher pressure pump. The agitator 29 may rotate coaxially with the axis AA. The agitator 29 is rotated by shaft 28. The shaft 28 is attached to a rotating adapter 17. In the example shown, shaft 28 is connected to rotating adaptor 17 by holder 30 that extends radially between shaft 28 and adaptor 17. In the example shown, shaft 28, adaptor 17, and holder 30 are integrally formed as a single component. It is understood, however, that not all examples are so limited.

The rotating adapter 17 rotates the shaft 28 which rotates the agitator 29. In this way, the electric motor 9 rotates the receiver hub 12 which rotates the pump rotor 13 which rotates the rotating adapters 17 which rotates the shaft 28 which rotates the agitator 29. In this relationship, the supply of power to the agitator 29 is taken from the pump rotor 13. The supply of power to agitator 29 can be considered to be downstream (not relative to material flow through pump 1, but instead relative to mechanical power transmission) relative to pump rotor 13. Driving power is provided to pump rotor 13, which then transmits the driving power to agitator 29. In this way, the shaft 28 powers rotation of the agitator 29 instead of the agitator 29 and/or shaft 28 being rotated to rotate the pump rotor 13. As such, the shaft 28 and/or agitator 29 do not need to be engineered to withstand high rotational loads that power the pump rotor 13.

It is noted that the rotating adapter 17 that mounts to the shaft 28 can be mounted on either end of the pump rotor 13. Therefore, the rotating adapter 17 that supports the shaft 28, along with the shaft 28, agitator 29, and feed housing 27 can be flipped to the other side of the pump 1 without removal of the pump rotor 13 and/or flipping of the pump housing 2.

Figure 7:
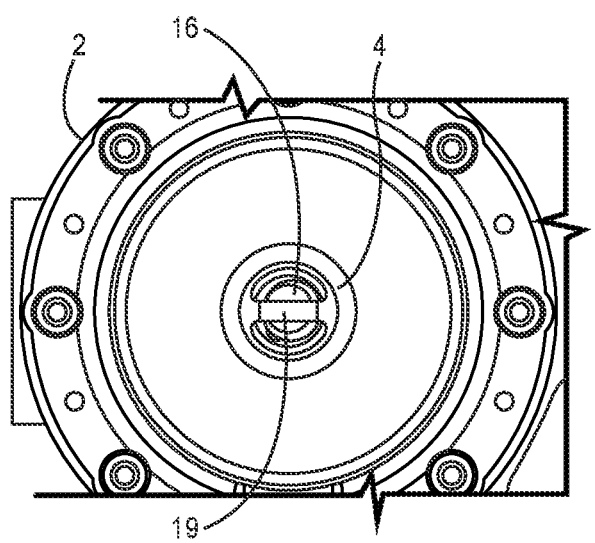
FIG. 7 is a partial end view of a pump.

FIG. 7 is an axial end view of pump 1. FIG. 7 shows inlet bracket 19 axially overlapping with helical stator 16 to inhibit axial movement of helical stator 16.

Figure 8A:
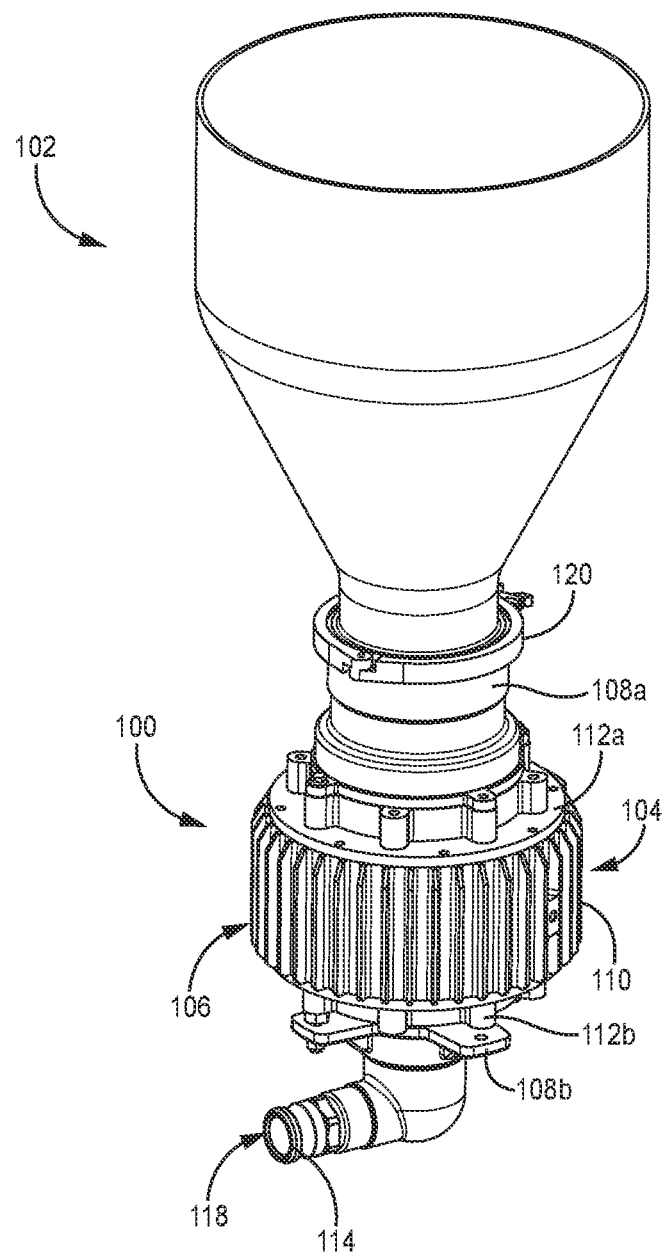
FIG. 8A is an isometric view of a pump with a hopper mounted to pump.
Figure 8B:
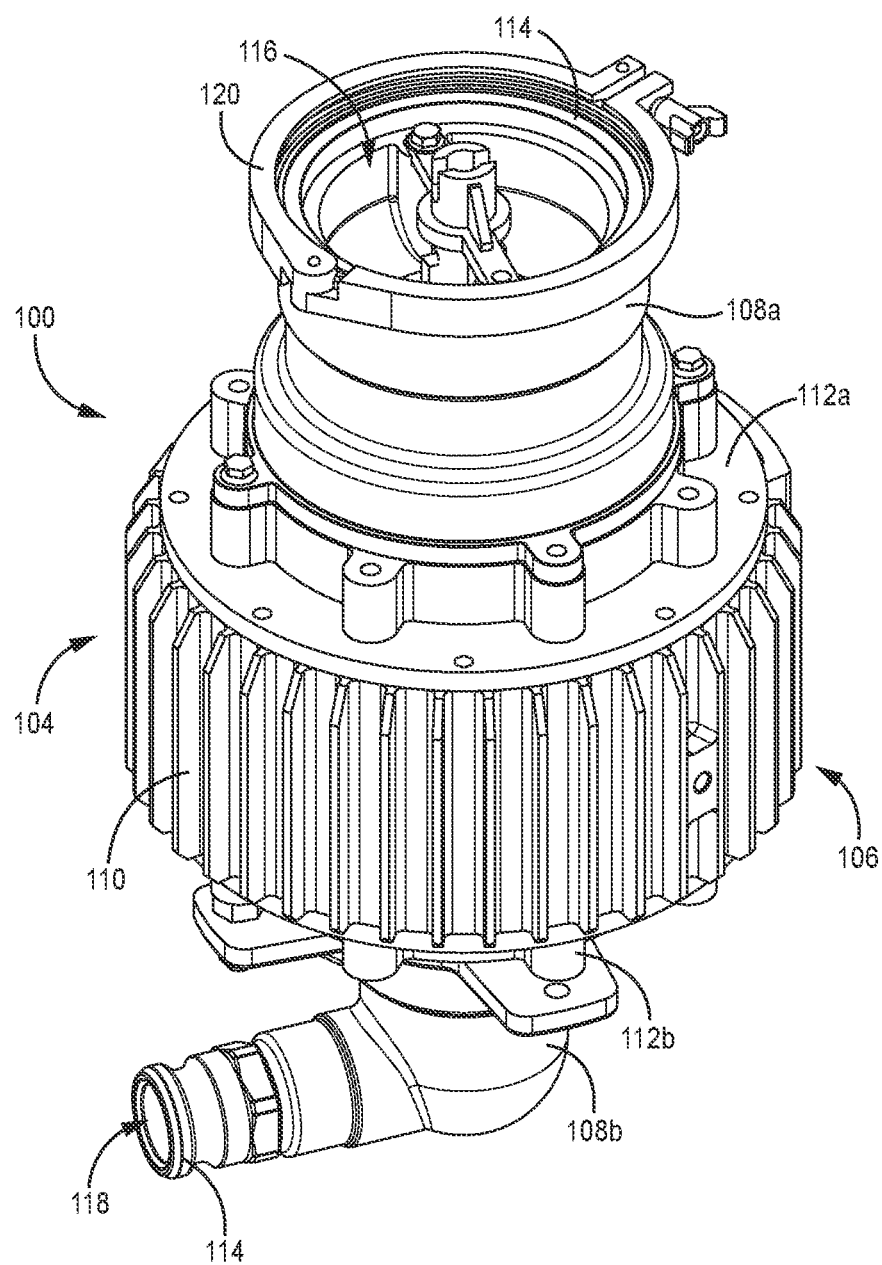
FIG. 8B is an isometric view of the pump shown in FIG. 8A with the hopper removed.

FIG. 8A is an isometric view of pump 100 showing hopper 102 mounted to pump 100. FIG. 8B is an isometric view of pump 100 with hopper 102 dismounted. Pump body 104 of pump 100 includes motor housing 106 and end covers 108a, 108b. Motor housing 106 includes pump housing 110 and end plates 112a, 112b. Each end cover 108a, 108b includes a fitting 114. End cover 108a defines pump inlet 116 and end cover 108b defines pump outlet 118.

Pump body 104 encloses and can support other components of pump 100. In the example shown pump housing 110 is disposed around an electric motor of pump 100 and around flowpaths for pumped material to flow through pump 100. End plates 112a, 112b are mounted at opposite axial ends of pump housing 110. End plates 112a, 112b are disposed on opposite axial ends of the electric motor. End cover 108a extends axially outward from end plate 112a. End cover 108b extends axially outward from end plate 112b. Pump inlet 116 is formed in end cover 108a. Pump 100 is configured to receive material for pumping through pump inlet 116, such as from hopper 102. Pump outlet 118 is formed in end cover 108b. The pumped material exits pump 100 through pump outlet 118.

In the example shown, end cover 108b defines a curved flowpath between the material exiting from motor housing 106 and the material exiting through pump outlet 118. The flowpath can include a 90-degree bend, among other options. Each end cover 108a, 108b includes a fitting 114, in the example shown. A hose or other component for routing a flow of fluid being pumped can attach to the fitting 114. For example, first hose can represent an inlet and a second hose can represent an outlet. As shown in FIG. 8A, hopper 102 is mounted to the inlet end cover 108a. Hopper 102 is secured to pump 100 by clamp 120 that interfaces with hopper 102 and with fitting 114 of end cover 108a.

Figure 9A:
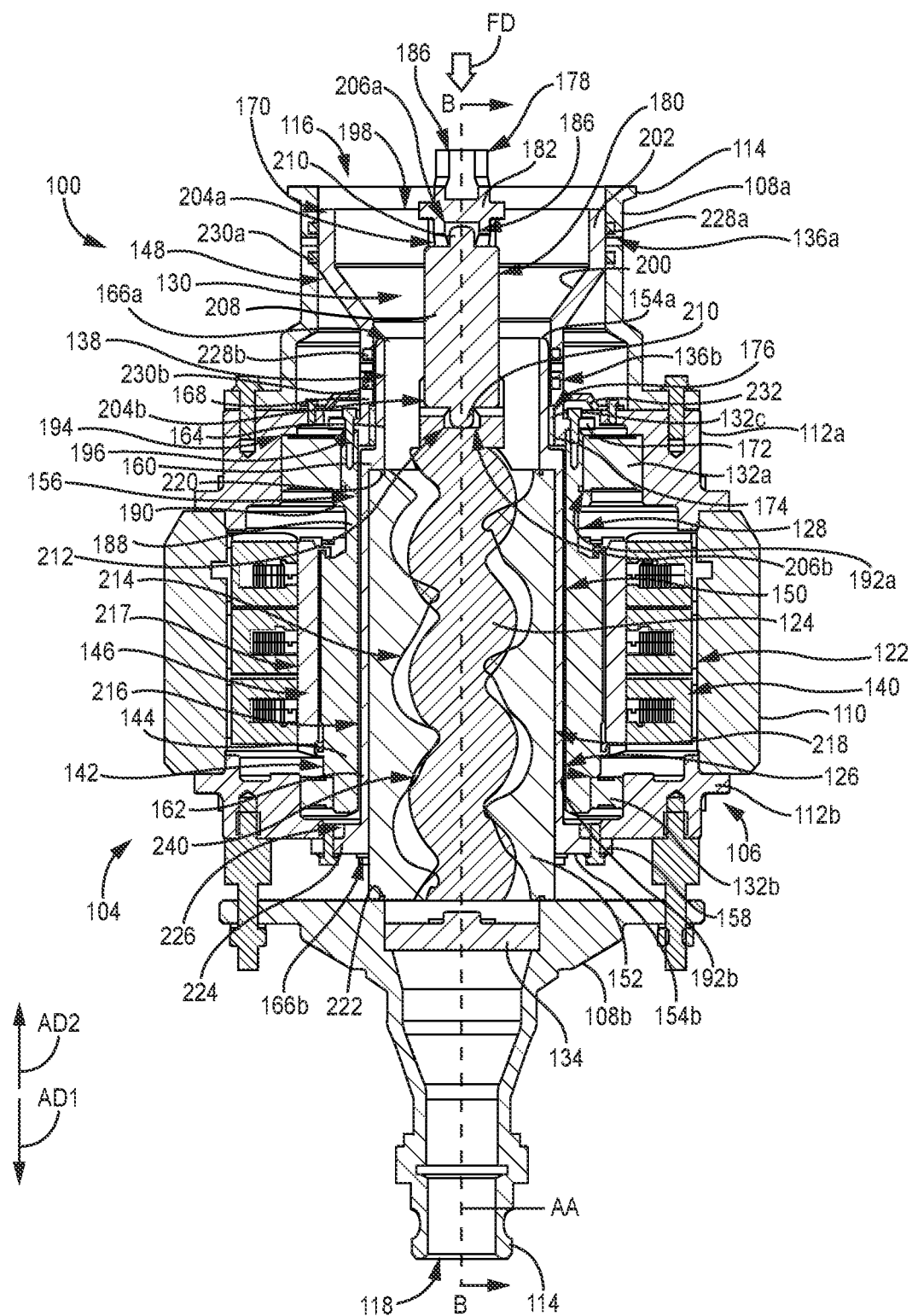
FIG. 9A is a cross-sectional view taken along line A-A in FIG. 9B.
Figure 9B:
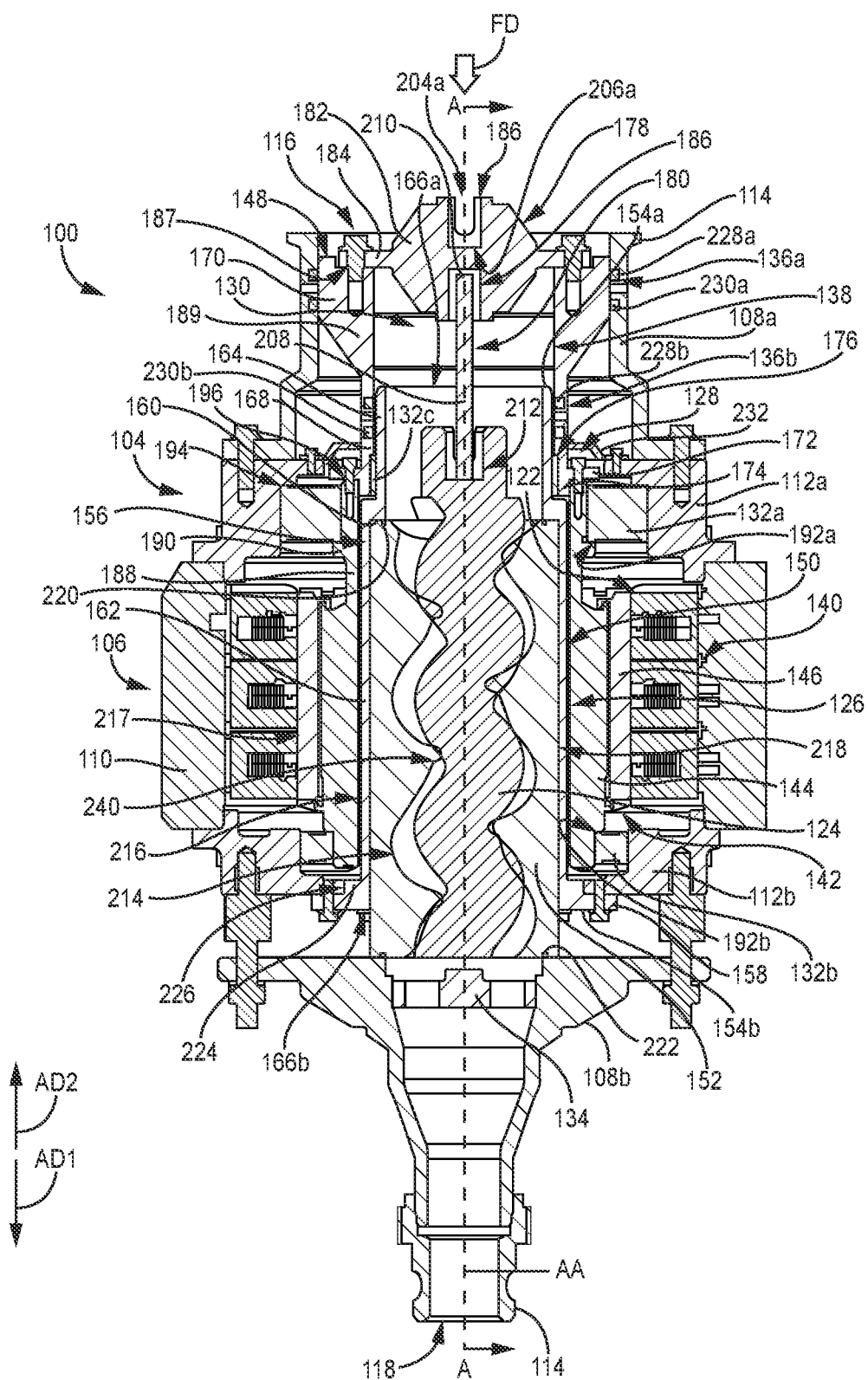
FIG. 9B is a cross-sectional view taken along line B-B in FIG. 9A.
Figure 10:
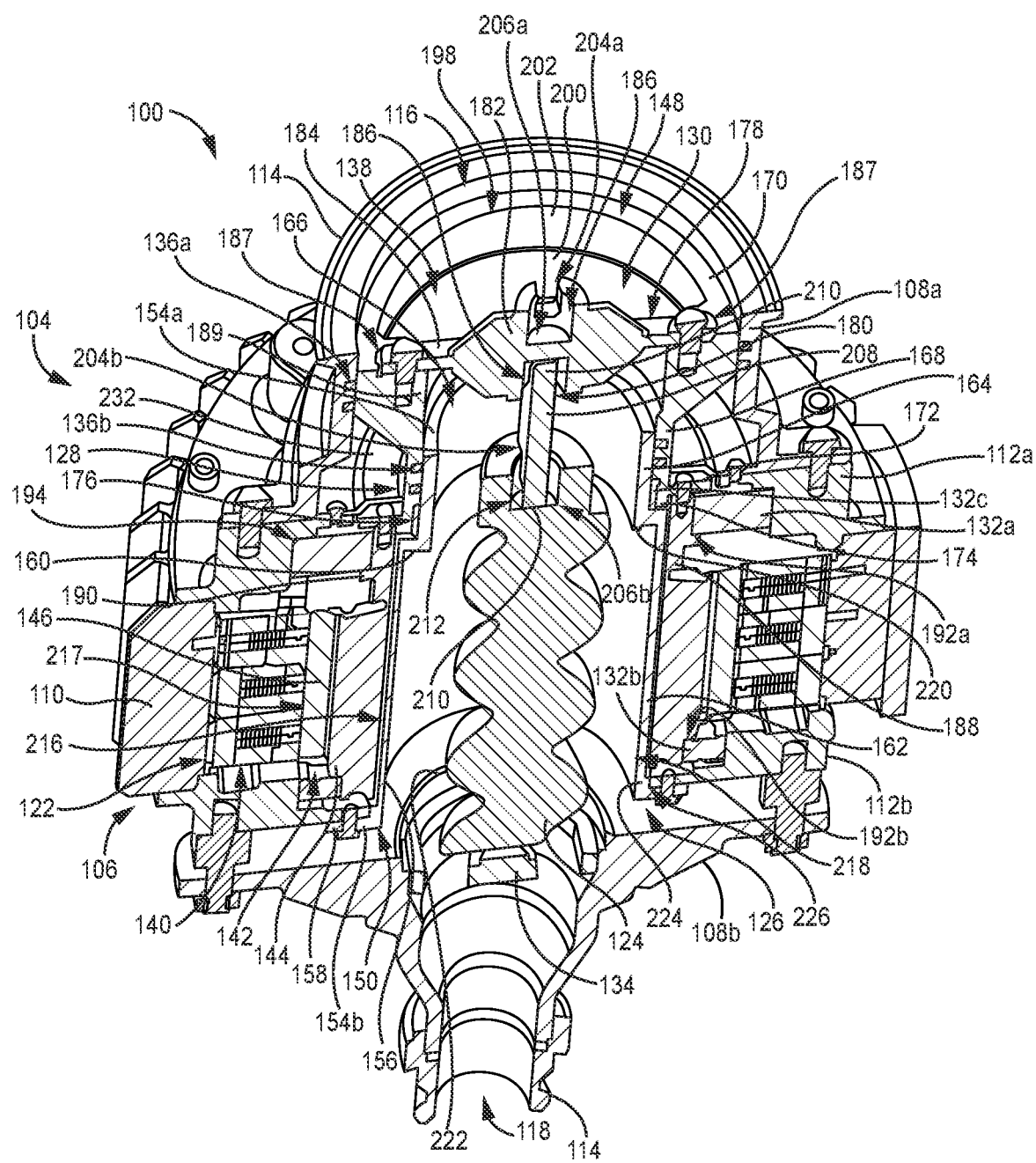
FIG. 10 is an isometric cross-sectional view taken along line B-B in FIG. 9A.

FIG. 9A is a cross-sectional view of pump 100 taken along line A-A in FIG. 8B. FIG. 9B is a cross-sectional view of pump 100 taken along line B-B in FIG. 8B. FIG. 10 is an isometric cross-sectional view of pump 100 taken along line B-B in FIG. 8B but with stator sleeve 152 removed to better illustrate internal components of pump 100. FIGS. 9A-10 will be discussed together.

Pump 100 includes pump body 104; motor 122; helical rotor rod 124; pump stator 126; outer drive 128; inner drive 130; bearings 132a-132c; stop 134; and dynamic seals 136a, 136b. Pump channel 138 extends through pump 100 between pump inlet 116 and pump outlet 118. Motor 122 includes motor stator 140 and motor rotor 142. Motor rotor 142 includes motor rotor body 144 and magnetic array 146. Outer drive 128 is formed by motor rotor body 144 and end adaptor 148. Inner drive 130 includes inwardly projecting support 178 and drive link 180. Pump stator 126 includes stator case 150 and stator sleeve 152. Stator case 150 extends between case ends 154a, 154b and includes case body 156, case flange 158, and brace shoulder 160. Case body 156 includes sleeve support body 162 and end projection 164. Case opening 166a is formed through case end 154a and case opening 166b is formed through case end 154b. End adaptor 148 includes adaptor shaft 168, adaptor head 170, radial flange 172, axial flange 174, bearing notch 176. Inwardly projecting support 178 includes bar body 182, wings 184, and bar receivers 186. Drive link 180 includes link body 208 and tabs 210.

Pump 100 is configured as a rotor-stator pump that pumps material from pump inlet 116 to pump outlet 118 by helical rotor rod 124 rotating relative to pump stator 126 to create a series of progressing cavities that move material through pump 100. The relative rotation creates a series of cavities that progress axially through pump 100 to increase a pressure of the material and displace the material. Pump 100 can also be referred to as a progressive cavity pump. Pump body 104 supports other components of pump 100.

Motor housing 106 forms a central portion of pump body 104. Motor housing 106 forms at least a portion of the exterior of pump 100. End plates 112a, 112b are connected to pump housing 110. End plates 112a, 112b are disposed at opposite axial ends of pump housing 110. In the example shown, end plate 112a is disposed at an upstream end of pump housing 110, relative to the direction of material flow through pump 100, which material flow direction is indicated by arrow FD, and end plate 112b is disposed at a downstream end of pump housing 110. It is understood, however, that the configuration of pump 100 can be reversed such that material flows in an opposite axial direction from that indicated by arrow FD.

Motor 122 is disposed within motor housing 106 and is supported by motor housing 106. Pump housing 110 is disposed around motor 122. Motor 122 is disposed radially within pump housing 110. Motor 122 is disposed axially between end plates 112a, 112b. Motor 122 is configured as an electric motor that is configured to generate a rotating mechanical output based on electrical inputs. Motor 122 is partially or entirely contained within the pump housing 110. Motor 122 includes a motor stator 140 that can include one or more coils for generating electromagnetic fields. The motor stator 140 can be fixed to the pump housing 110, such as with potting material, such as epoxy.

Motor 122 includes a motor rotor 142 that is rotatably driven by the electromagnetic fields generated by the motor stator 140. Motor air gap 217 is disposed radially between motor rotor 142 and motor stator 140 and separates motor rotor 142 from motor stator 140. The motor rotor 142 can include magnets (e.g., permanent and/or electromagnets) forming the magnetic array 146 that is supported on motor rotor body 144. The magnets forming the magnetic array 146 are configured to be driven to move by the electromagnetic fields generated by the motor stator 140 to rotate the motor rotor 142 relative to the motor stator 140. Flux interaction between the electromagnetic fields generated by motor stator 140 and the magnetic fields from magnetic array 146 interact in motor air gap 217 to drive rotation of motor rotor 142. Motor rotor 142 is disposed about and rotates on pump axis AA. As such, the rotational axis of motor rotor 142 is disposed coaxially with pump axis AA in the example shown. In the example shown, motor 122 is configured as an inner rotating motor, in that motor rotor 142 is disposed within motor stator 140 to rotate within motor stator 140. It is understood, however, that not all examples are so limited.

In the example shown, motor rotor body 144 extends axially outward relative to motor stator 140. Motor rotor body 144 extends from radially within the electromagnetic components of motor stator 140 (e.g., the coils and any flux carrying material such as lamina sheets) to axially beyond the electromagnetic components. Motor rotor body 144 extends in both first axial direction AD1 beyond the motor stator 140 and in second axial direction AD2 beyond the motor stator 140. Motor rotor body 144 extends axially outward in both axial directions AD1, AD2 relative to magnetic array 146 that is mounted on and supported by motor rotor body 144.

Motor rotor body 144 includes rotor projection 188 that extends in second axial direction AD2 away from magnetic array 146. Rotor projection 188 is a cylindrical projection that extends axially from the magnet supporting portion of motor rotor body 144, which magnet supporting portion radially overlaps with the permanent magnetic array 146. Bearing flange 190 projects radially from rotor projection 188. Bearing flange 190 interfaces with an axial face of bearing 132a to support bearing 132a. Bearing flange 190 and rotor projection 188 form rotor notch 192a that receives bearing 132a. In some examples, bearing flange 190 interfaces with an inner race of bearing 132a. Bearing 132a is further supported by body notch 194 of the pump body 104. In the example shown, body notch 194 is formed in end plate 112a.

Guard 232 is mounted to end plate 112a. Guard 232 extends radially inward from an interface with end plate 112a towards pump axis AA. Guard 232 extends annularly around outer drive 128. Guard 232 is disposed axially over the radial gap between outer drive 128 and end plate 112a. Guard 232 is configured to prevent material from flowing towards bearing 132a, protecting bearing 132a. Guard further inhibits material flow towards the electromagnetic components of motor 122, protecting motor 122.

A portion of motor rotor body 144 interfaces with bearing 132b. Rotor notch 192b of motor rotor body 144 interfaces with a radially inner side of bearing 132b and with an axial face of bearing 132b oriented in second axial direction AD2. In the example shown, an axial face of bearing 132b does not interface with the pump body of pump 100. Bearing 132b is not axially restrained by static support structure of pump 100. As such, bearing 132b does not react axial loads generated during pumping. Instead, axial loads are reacted by bearing 132a. Such a configuration facilitates forming bearing 132b as a smaller bearing than bearing 132a as bearing 132b is not required to react the axial loads.

Pump 100 is configured to pump materials from pump inlet 116 to pump outlet 118 by relative rotation. Helical rotor rod 124 is configured to rotate relative to pump stator 126 to pump material from pump inlet 116 to pump outlet 118. Helical rotor rod 124 can also be referred to as a pump rotor of pump 100. Rotation of helical rotor rod 124 is powered by motor 122. Motor 122 generates the torque that is transmitted to helical rotor rod 124 to drive rotation of helical rotor rod 124. Rotation of motor rotor 142 is caused by the electromagnetic fields generated by motor stator 140. In the example shown, helical rotor rod 124 is rotated by outer drive 128 and inner drive 130. Outer drive 128 extends axially from motor 122 and is driven to rotate on pump axis AA by motor 122. In the example shown, outer drive 128 extends axially away from motor 122 in second axial direction AD2. Outer drive 128 receives torque from motor 122 and transmits the torque axially in second axial direction AD2. Outer drive 128 transmits the torque axially outwards in second axial direction AD2 and away from motor 122. Outer drive 128 forms a rotating tube through which pumped material flows during operation. In the example shown, outer drive 128 is formed by motor rotor body 144 and end adaptor 148. While end adaptor 148 is shown as formed separately from and connected to motor rotor body 144 in the example shown, it is understood that not all examples are so limited. End adaptor 148 can be in the form of a tube. In some examples, end adaptor 148 does not radially overlap with either of helical rotor rod 124 or stator sleeve 152.

Motor rotor 142 is connected to helical rotor rod 124 to drive rotation of helical rotor rod 124 on axis AA. In the example shown, motor rotor 142 is connected to helical rotor rod 124 for simultaneous rotation. In the example shown, no intermediate gearing is present between motor rotor 142 and helical rotor rod 124 such that motor rotor 142 drives helical rotor rod 124 at a 1:1 revolution ratio. Motor rotor 142 causes a full rotation of helical rotor rod 124 for each full rotation of motor rotor 142.

End adaptor 148 is mounted to motor rotor 142. End adaptor 148 is connected to motor rotor 142 to be rotatably driven by motor rotor 142. End adaptor 148 is formed separately from and connected to motor rotor 142, in the example shown. End adaptor 148 is connected to motor rotor body 144 by fasteners that extend through radial flange 172 of end adaptor 148 and into rotor projection 188 of motor rotor body 144. The fasteners extend into the axial end face of rotor projection 188 in the example shown. It is understood, however, that not all examples include end adaptor 148 formed separately from motor rotor body 144. For example, end adaptor 148 and motor rotor body 144 can be formed as a monolithic structure. In some examples, motor rotor body 144 and end adaptor 148 can be separately formed and permanently connected together, such as by welding, among other options. Outer drive 128 can be considered to form a unitary component in examples in which end adaptor 148 is permanently connected to motor rotor body 144 and in examples in which end adaptor 148 and motor rotor body 144 are formed monolithically.

End adaptor 148 is connected to motor rotor 142 such that end adaptor 148 rotates with motor rotor 142 on axis AA. End adaptor 148 rotates coaxially with motor rotor 142. Adaptor shaft 168 of end adaptor 148 extends in second axial direction AD2 away from motor 122. Axial flange 174 forms the axial end of adaptor shaft 168 oriented in first axial direction AD1. Axial flange 174 extends to be within a portion of motor rotor body 144. Axial flange 174 extends to radially overlap with a portion of motor rotor body 144. An outer radial side of axial flange 174 can interface with an inner radial side of motor rotor body 144. Specifically, the outer radial side of axial flange 174 can interface with the inner radial side of rotor projection 188.

Axial flange 174 extending into motor rotor body 144 aligns end adaptor 148 with motor rotor body 144 on pump axis AA. Axial flange 174 extending into motor rotor body 144 provides concentricity between end adaptor 148 and motor rotor 142. In some examples, the outer radial side of axial flange 174 and the inner radial side of motor rotor body 144 can be faceted surfaces to rotationally lock end adaptor 148 to motor rotor body 144 and prevent relative rotation therebetween. Radial flange 172 projects radially outward from adaptor shaft 168. Axial flange 174 and radial flange 172 form adaptor notch 196 that receives a portion of motor rotor body 144. Adaptor notch 196 is open radially outward, away from axis AA. Adaptor notch 196 is open axially towards motor 122 and in first axial direction AD1. Adaptor notch 196 receiving a portion of motor rotor body 144 can locate end adaptor 148 coaxially with motor rotor 142 and axially relative to motor rotor body 144.

Adaptor head 170 is disposed at one axial end of adaptor shaft 168. Adaptor head 170 is disposed at an opposite axial end of adaptor shaft 168 from motor rotor body 144. Adaptor head 170 extends radially from adaptor shaft 168 and axially in second axial direction AD2 from adaptor shaft 168. In the example shown, adaptor head 170 is formed at an upstream end of end adaptor 148. Material flowing through pump channel 138 first enters end adaptor 148 at adaptor head 170. Drive opening 198 is formed through a distal end of end adaptor 148. In the example shown, drive opening 198 is formed in adaptor head 170. Drive opening 198 forms an aperture through which material can flow into or out of end adaptor 148. In the example shown, end adaptor 148 is disposed upstream of pump interface 240 on an inlet side of pump 100. As such, drive opening 198 is configured to form an adaptor inlet through which material enters into the rotating outer drive 128. In other examples in which end adaptor 148 is disposed on a downstream side of pump interface 240, drive opening 198 forms an adaptor outlet from which material exits from the rotating outer drive 128 of pump 100.

In the example shown, outer drive 128 includes a funnel that directs the material radially inwards towards pump axis AA as the material flows in first axial direction AD1. Adaptor head 170 includes sloped wall 200 and end wall 202. Sloped wall 200 extends from adaptor shaft 168 to end wall 202. Sloped wall 200 is canted relative to pump axis AA to extend radially outward from adaptor shaft 168 and axially away from adaptor shaft 168. End wall 202 is disposed at an opposite axial end of sloped wall 200 from adaptor shaft 168. End wall 202 extends axially in second axial direction AD2. In the example shown, adaptor head 170 forms the funnel that directs material radially inward towards axis AA as material flows through end adaptor 148. Sloped wall 200 narrows the diameter of the flowpath through end adaptor 148 in the downstream direction (e.g., in first axial direction AD1). Sloped wall 200 funnels the material radially inward. Directing the material radially inward assists in feeding material towards the pump interface 240 between helical rotor rod 124 and pump stator 126, providing improved pumping efficiency. The funnel is formed by outer drive 128 such that the funnel is a rotating funnel that directs the material radially inward to the pump interface 240.

End adaptor 148 is disposed on a low pressure side of pump 100. The low pressure side of pump is upstream of pump interface 240 as the pressure of the material driven through pump 100 by rotation of helical rotor rod 124 relative to helical stator sleeve 152 increases the pressure of the material as the material is displaced axially along pump interface 240. End adaptor 148 is disposed on an inlet side of pump 100. End adaptor 148 being disposed on the upstream, inlet, low pressure side of pump 100 means less material pressure acts on end adaptor 148 and sealing interfaces of end adaptor 148, reducing wear, providing longer operating life, and reducing maintenance and material costs.

End adaptor 148 is disposed within end cover 108a that is mounted to end plate 112a. End cover 108a is fixed to end plate 112a such that end cover 108a does not rotate relative to motor housing 106 during operation. End plate 112a is statically held and is configured to remain stationary during operation of pump 100. End cover 108a forms a hollow structure that facilitates material flowing through end cover 108a. Pump inlet 116 is formed through end cover 108a in the example shown. Pump inlet 116 is formed in at an axially opposite end of end cover 108a from motor 122. The fitting 114 of end cover 108a is formed at an end of end cover 108a opposite the end of end cover 108a that interfaces with end plate 112a.

End adaptor 148 is disposed radially within the static end cover 108a. End adaptor 148 forms a tube through which the material flows during pumping. End adaptor 148 is a rotating tube that is disposed radially within the static tube formed by end cover 108a. End adaptor 148 is disposed within end cover 108a such that end adaptor 148 radially overlaps with end cover 108a. End adaptor 148 is configured to rotate with motor rotor 142 while end cover 108a remains stationary. As such, end adaptor 148 rotates relative to end cover 108a during operation. End adaptor 148 is disposed fully within static components of pump 100 in the example shown. End adaptor 148 is disposed such that no portion of the rotating end adaptor 148 projects axially outwards beyond static components of pump 100, though it is understood that not all examples are so limited.

Inner drive 130 is connected to outer drive 128 to be rotated by outer drive 128. Inner drive 130 extends in first axial direction AD1 from the interface between inner drive 130 and outer drive 128. Inner drive 130 extends in first axial direction AD1 back towards motor 122. Inner drive 130 extends axially towards motor 122. Inner drive 130 transmits torque back towards motor 122 from outer drive 128. Outer drive 128 transmits torque to inner drive 130 to drive rotation of inner drive 130 on pump axis AA. Inner drive 130 transmits torque to helical rotor rod 124 to drive rotation of helical rotor rod 124. In the example shown, inner drive 130 is formed by inwardly projecting support 178 and drive link 180. It is understood, however, that not all examples are so limited. For example, inner drive may include only a crossbar, similar to the connection between helical stator rod 16 and outlet bracket 20, if outlet bracket 20 formed the crossbar and was connected to outer drive 128 to be rotated by outer drive 128. Inner drive 130 is disposed within pump channel 138. Inner drive 130 is exposed to the material flowing through pump channel 138. In the example shown, inner drive 130 connects to outer drive 128 at a location spaced in second axial direction AD2 from pump interface 240. Inner drive 130 connects to outer drive 128 to receive torque from outer drive 128 on a low pressure side of pump interface 240. In the example shown, the torque generated by motor 122 is transmitted in the upstream direction by outer drive 128 and then transmitted back in the downstream direction by inner drive 130.

Inwardly projecting support 178 is supported by end adaptor 148. In the example shown, inwardly projecting support 178 is formed as a crossbar that spans the pump channel 138. It is understood, however, that not all examples are so limited. For examples, inwardly projecting support 178 can be configured as a projection that only partially spans channel 138, such that inwardly projecting support 178 is cantilevered into channel 138.

Inwardly projecting support 178 is connected to end adaptor 148 such that inwardly projecting support 178 rotates with end adaptor 148. In the example shown, inwardly projecting support 178 is mounted to an axial end of end adaptor 148 opposite motor 122. Inwardly projecting support 178 is mounted to adaptor head 170 in the example shown. More specifically, inwardly projecting support 178 is mounted to an end of end wall 202 of adaptor head 170. Bar body 182 is disposed in the flowpath of the material moving from pump inlet 116 towards pump interface 240. Wings 184 extend radially from bar body 182. Wings 184 project from bar body 182 to axially overlap with the end face of end adaptor 148 oriented in second axial direction AD2. In the example shown, inwardly projecting support 178 is mounted to end adaptor 148 by fasteners extending through wings 184 and into end adaptor 148, though it is understood that other connection types are possible. In some examples, inwardly projecting support 178 can be formed integrally with end adaptor 148. For example, inwardly projecting support 178 and end adaptor 148 can be formed as a monolithic structure. In the example shown, and as best seen in FIG. 10, each wing 184 is recessed at least partially within a wing receiver 187 formed in the axial end face of end adaptor 148. Wing receivers 187 are notches extending into the axial end face of end adaptor 148. The wings 184 being recessed within wing receivers 187 enhances torque transmission between outer drive 128 and inner drive 130 and inhibits relative rotation between inwardly projecting support 178 and end adaptor 148.

In the example shown, end adaptor 148 includes wing braces 189 that extend radially towards pump axis AA and on which wing recesses 187 are formed. Wing braces 189 are disposed axially below wings 184 and provide structural support to enhance the strength of end adaptor 148 at the interfaces with wings 184 to transfer torque between the outer drive 128 and the inner drive 130. Wing braces 189 further provide locations for fasteners to extend into end adaptor 148 to connect inwardly projecting support 178 to end adaptor 148. Wing braces 189 can divide the funnel formed by end adaptor 148 such that the funnel is formed as multiple funneling portions, two in the example shown, that both funnel towards the axis AA, though it is understood that not all examples are so limited.

Inwardly projecting support 178 spans the pump channel 138 in the example shown. In various other embodiments, however, the inwardly projecting support 178 projects radially inward in the pump channel 138 but does not bridge from one side to an opposite side of the end adaptor 148 in which case the inwardly projecting support 178 is cantilevered into the pump channel 138. Inwardly projecting support 178 extends into pump channel 138 and to pump axis AA such that pump axis AA extends through the bar body 182 of inwardly projecting support 178. Inwardly projecting support 178 spans a full width of pump channel 138 in the example shown. Inwardly projecting support 178 being disposed in the pump channel 138 and spanning the pump channel 138 facilitates inwardly projecting support 178 agitating the materials as the material flows towards pump interface 240. Such agitation improves material flow to pump interface 240, providing improved pumping efficiency.

Bar receivers 186 are formed in bar body 182. In the example shown, inwardly projecting support 178 includes a pair of bar receivers 186 formed on each axial side of bar body 182. Each bar receiver 186 includes a slot 204*a* that extends radially though bar body 182. Bar receivers 186 are open axially to allow inwardly projecting support 178 to move axially off of or axially into engagement with drive link 180. Each bar receiver 186 further includes recess 206*a* that extends axially into bar body 182 from the slot 204*a* of the bar receiver 186. Recess 206*a* and slot 204*a* facilitate transmitting rotational energy to drive link 180 while allowing drive link 180 to rock and pivot relative to inwardly projecting support 178. Such relative movement allows for orbital movement of helical rotor rod 124 relative to pump axis AA, as discussed in more detail below.

In the example shown, the two bar receivers 186 are structurally similar. In some examples, the multiple bar receivers 186 are formed identically to each other, though it is understood that not all examples are so limited. Some examples of inwardly projecting support 178 can be considered to be symmetrical relative to a plane normal to the pump axis AA. Such a symmetrical configuration of inwardly projecting support 178 facilitates flipping of the inwardly projecting support 178 to increase the operational life of inwardly projecting support 178. For example, a first one of bar receivers 186 will initially interface with drive link 180 to transmit rotational force to drive link 180. When that first bar receiver 186 becomes worn, inwardly projecting support 178 can be disconnected from end adaptor 148, flipped such that the second bar receiver 186 is oriented towards drive link 180, and reconnected to end adaptor 148. The second bar receiver 186, which is not worn, then interfaces with drive link 180 to transmit rotational force to drive link 180. Flipping of inwardly projecting support 178 can thus double the operational life of inwardly projecting support 178.

Rod receiver 212 is formed in an axial end of helical rotor rod 124. Rod receiver 212 includes a slot 204*b* that extends radially though the helical rotor rod. Rod receiver 212 is disposed in an end of helical rotor rod 124 oriented towards inner drive 130. Rod receiver 212 is open in second axial direction AD2 towards inner drive 130. In the example shown, rod receiver 212 is formed at an upstream end of helical rotor rod 124. Rod receiver 212 is disposed at an axial end of helical rotor rod 124 oriented in second axial direction AD2. Rod receiver 212 is formed on a low pressure end of helical rotor rod 124. Rod receiver 212 is open axially to allow drive link 180 to move axially off of or axially into engagement with helical rotor rod 124. Rod receiver 212 further includes recess 206*b* that extends axially into the body of helical rotor rod 124 from the slot 204*b* of the rod receiver 212. Recess 206*b* and slot 204*b* facilitate transmitting rotational energy to helical rotor rod 124 from drive link 180 while allowing drive link 180 to rock and pivot relative to helical rotor rod 124. Such relative movement allows for orbital movement of helical rotor rod 124 relative to pump axis AA during pumping.

Drive link 180 extends between and connects inwardly projecting support 178 and helical rotor rod 124. Drive link 180 is configured to transmit rotational force to helical rotor rod 124 to drive rotation of helical rotor rod 124. Link body 208 is partially disposed in bar receiver 186 of inwardly projecting support 178 and partially disposed in rod receiver 212 of helical rotor rod 124. More specifically, link body 208 extends into slot 204*a* of bar receiver 186 and into slot 204*b* of rod receiver 212. Link body 208 is formed as a flat plate in the example shown, though it is understood that other configurations are possible. Tabs 210 are disposed at both axial ends of link body 208. A first one of tabs 210 is oriented in first axial direction AD1 and extends into recess 206*b* of rod receiver 212. A second one of tabs 210 is oriented in second axial direction AD2 and extends into recess 206*a* of bar receiver 186. During operation, tabs 210 can bottom out with in the respective bar receiver 186 and rod receiver 212 such that link body 208 floats within slots 204*a*, 204*b*. Link body 208 can be narrower than slots 204*a*, 204*b*. Drive link 180 can rock relative to inwardly projecting support 178 and helical rotor rod 124 lengthwise within slots 204*a*, 204*b* and widthwise within slots 204*a*, 204*b*. Such a configuration facilitates drive link 180 transmitting rotational force to helical rotor rod 124 to drive rotation of helical rotor rod 124 while allowing misalignment between helical rotor rod 124 and pump axis AA. Such misalignment allows some rotation of the helical rotor rod 124 relative to inwardly projecting support 178 about the axis AA but not complete relative rotations. The connection formed between inner drive 130 and helical rotor rod 124 (e.g., formed by drive link 180) facilitates orbiting of helical rotor rod 124 on pump axis AA while helical rotor rod 124 rotates, providing efficient pumping by pump 100.

Drive link 180 is disposed axially between inwardly projecting support 178 and helical rotor rod 124 and is in the flowpath of the pumped material such that drive link 180 is exposed to the material flowing through pump 100. Drive link 180 transmits rotational motion between inwardly projecting support 178 and helical rotor rod 124 but does not fix helical rotor rod 124 to inwardly projecting support 178. Helical rotor rod 124 is not rigidly connected to inwardly projecting support 178. In the example shown, drive link 180 is not fixed to either inwardly projecting support 178 or helical rotor rod 124 to inhibit axial movement of drive link 180; instead, axial movement of drive link 180 in first axial direction AD1 is prevented only by interference by helical rotor rod 124 and axial movement of drive link 180 in second axial direction AD2 is prevented only by interference by inwardly projecting support 178. Drive link 180 can be removed and replaced by simply removing inwardly projecting support 178 and then pulling drive link 180 in second axial direction AD2. No fastener between drive link 180 and helical rotor rod 124 needs to be manipulated or disconnected to remove drive link 180 from helical rotor rod 124.

No fastener between inwardly projecting support 178 and drive link 180 needs to be manipulated or disconnected to remove inwardly projecting support 178 from drive link 180.

Helical rotor rod 124 is configured to rotate on pump axis AA relative to pump stator 126 to pump material. Helical rotor rod 124 can also be referred to as a pump rotor. Helical rotor rod 124 is located partially within the stator sleeve 152. Helical rotor rod 124 extends into the cavity channel 214 of stator sleeve 152. Helical rotor rod 124 can be formed from a stiff material, such as metal. The helical rotor rod 124 can be formed in the shape of the helix or other lobed structure. The helical rotor rod 124 is complementary to the stator sleeve 152 such that relative rotation develops moving pockets to move fluid along the pump channel 138 in the manner of a progressive cavity pump. The helical rotor rod 124 can be a single helix complementary to the double helix of the helical cavity stator sleeve 152, among other options. Helical rotor rod 124 is a solid structure and material does not flow within helical rotor rod 124 during operation. Instead, the exterior surfaces of helical rotor rod 124 interface with the material and form the progressing pockets that pump the material. In the example shown, helical rotor rod 124 is cantilevered from inner drive 130. One axial end of helical rod 124 is connected to inner drive 130 and the other axial end is free.

During pumping, the material exerts a force on helical rotor rod 124 in second axial direction AD2. Drive link 180 is captured axially between helical rotor rod 124 and inwardly projecting support 178 such that the axial loads on helical rotor rod 124 are resisted by drive link 180 to prevent displacement of helical rotor rod 124 in second axial direction AD2. Inner drive 130 thus resists movement of helical rotor rod 124 in second axial direction AD2.

Stop 134 is disposed on an opposite axial side of helical rotor rod 124 from drive link 180. Stop 134 is disposed in the flowpath of the material exiting from pump interface 240 formed between helical rotor rod 124 and pump stator 126. Stop 134 is disposed on a downstream side of helical rotor rod 124. Stop 134 is disposed to inhibit axial movement of helical rotor rod 124 in first axial direction AD1. In the example shown, stop 134 is disposed within and supported by end cover 108*b*.

Helical rotor rod 124 is configured to rotate relative to pump stator 126 to pump the material. Pump stator 126 includes stator case 150 that is supported by other static components of pump 100 and includes stator sleeve 152. Stator sleeve 152 is disposed at least partially within stator case 150. Stator sleeve 152 can also be referred to as a stator helical cavity sleeve. Stator sleeve 152 can define a helical cavity channel 214 along the axis AA. The cavity channel 214 may be a single helix or a double helix, amongst other options. The material that forms the stator sleeve 152 can be rubber (e.g., a polymer) or other compliant material. As shown, the stator sleeve 154 extends axially beyond the stator case 150. More specifically, stator sleeve 152 projects axially outward from stator case 150 in the downstream direction relative to material flow. Stator sleeve 152 projects axially outward from stator case 150 in first axial direction AD1. The axial end face of stator sleeve 152 that is disposed outside of stator case 150 interfaces with end cover 108*b* to form a fluid-tight seal therebetween. A length of stator sleeve 152 unsupported by stator case 150 spans the axial gap between end plate 112*b* and end cover 108*b* such that stator sleeve 152 engages with end cover 108*b*.

In some examples, stator sleeve 152 can be keyed to stator case 150 to prevent relative rotation therebetween. For example, the inner radial surface of stator case 150 can be faceted (e.g., hexagonal, octagonal, etc.) and the outer radial surface of stator case 150 can be similarly faceted to have a mating shape that interfaces with the faceted surface of stator case 150 to prevent relative rotation therebetween.

Stator sleeve 152 is removable from stator case 150. Pump 100 can be reconfigured to have pumping components of different sizes, thereby changing the displacement of pump 100. For example, stator sleeve 152 can be removed from stator case 150 and replaced with a stator sleeve 152 having a different length, a stator sleeve 152 having a differently sized cavity channel 214, etc. The helical rotor rod 124 can similarly be removed and replaced with a helical rotor rod 124 having a different length, a helical rotor rod 124 having a different width, having a different helix diameter, etc. The replacement stator sleeve 152 can be installed within and supported by stator case 150 without removing or replacing stator case 150. The replacement helical rotor rod 124 can be installed without removing or replacing stator case 150. Pump 100 can initially include a first stator sleeve 152 having a first sleeve configuration and include a first helical rotor rod 124 having a first rod configuration. The first stator sleeve 152 and first helical rotor rod 124 can be removed and replaced with a second stator sleeve 152 having a second sleeve configuration different from the first sleeve configuration and a second helical rotor rod 124 having a second rod configuration different from the first rod configuration, respectively. In some examples, the second stator sleeve 152 can have a different configuration of cavity channel 214 (e.g., different width, length etc.) from the first stator sleeve 152, but the two stator sleeves 152 can include the same exterior diameter such that either the first or second stator sleeve 152 can mount within the same configuration of stator case 150.

Pump 100 is configured to facilitate quick and easy removal and replacement of helical rotor rod 124. To replace helical rotor rod 124, inwardly projecting support 178 is removed from outer drive 128. Drive link 180 can then be pulled in second axial direction AD2 and off of helical rotor rod 124. The helical rotor rod 124 can be serviced and replaced in pump 100 or a different helical rotor rod 124 can be placed in pump. After a helical rotor rod 124 is inserted into the stator sleeve 152, drive link 180 is aligned with helical rotor rod 124 such that link body 208 is aligned with slot 204*b*. Drive link 180 is shifted into pump 100 in first axial direction AD1 and a portion of drive link 180 enters into rod receiver 212. Crossbar 180 is aligned with drive link 180 such that link body 208 is aligned with slot 204*a* and crossbar 180 is moved onto drive link 180 such that a portion of drive link 180 enters into bar receiver 186. For example, inwardly projecting support 178 can be placed on drive link 180 and then rotated by the user until drive link 180 enters into slot 204*a*. When drive link 180 is initially interfaced with inwardly projecting support 178, wings 184 may be misaligned with wing receivers 187 of outer drive 128. To finish installation, the user can grasp outer drive 128, such as by grasping end adaptor 148, and rotate outer drive 128 on axis AA until wings 184 are aligned with wing receivers 187. The wings 184 are placed into wing receivers 187 and inwardly projecting support 178 is fastened to outer drive 128. A hopper 102 or other feed can then be connected to end cover 108*a* and pump 100 is ready for pumping.

In some examples, stator case 150 is removable from pump 100 and can be replaced with a second stator case 150 having a different configuration associated with a different stator sleeve 152. For example, stator case 150 can be removed and replaced with a stator case 150 having sleeve support body 162 of a different internal diameter than that shown. The different internal diameter can receive a stator sleeve 152 having a different internal diameter.

In some examples, a stator sleeve 152 having a longer axial length can be replaced in the same stator case 150. For example, end cover 108b can be removed and then stator sleeve 152 can be removed from stator case 150. A second stator sleeve 152 having a different axial length can then be inserted into stator case 150. End cover 108b is reconnected to end plate 112b to clamp that second stator sleeve 152 axially between end cover 108b and brace shoulder 160. End cover 108b is mounted at a different axial location relative to end cover 108b to facilitate the different length of stator sleeve 152. For example, end cover 108b can be mounted axially further from end plate 112b (e.g., with longer fasteners, etc.), thereby changing a size of the axial gap between end cover 108b and end plate 112b, to accommodate a stator sleeve 152 having a longer axial length. End cover 108b can be mounted axially closer to end cover 108b, thereby changing a size of the axial gap between end cover 108b and end plate 112b, to accommodate aa stator sleeve 152 having a shorter axial length.

Stator case 150 is connected to other static components of pump 100. Stator case 150 is configured to remain stationary as helical rotor rod 124 rotates within stator case 150. Case body 156 of stator case 150 extends axially between case end 154a and case end 154b. Case end 154a can also be referred to as a free end of stator case 150. In the example shown, case end 154a forms an upstream end or inlet end of stator case 150. In the example shown, case end 154a is not independently statically held to prevent rotation of stator case 140. Case end 154a is prevented from rotation by connection to case end 154b that is statically held.

Case end 154b can also be referred to as a fixed end of stator case 150. In the example shown, case end 154b forms a downstream end or outlet end of stator case 150. Case opening 166a is formed in case end 154a and is an aperture that allows flow of material into or out of stator case 150. Case opening 166b is formed in case end 154b and is an aperture that allows flow of material into or out of stator case 150. In the example shown, case opening 166a can also be referred to as a case inlet as material enters into stator case 150 through case opening 166a. In the example shown, case opening 166b can also be referred to as a case outlet as material exits from stator case 150 through case opening 166b. Case body 156 defines sleeve cavity 218 that is disposed radially within stator case 150. Sleeve cavity 218 is open in both axial directions AD1 and AD2. Stator sleeve 152 is at least partially disposed in sleeve cavity 218.

In the example shown, case body 156 includes sleeve support body 162 that extends axially from case end 154b and includes end projection 164 that extends axially from sleeve support body 162, though it is understood that not all examples are so limited. Sleeve support body 162 defines sleeve cavity 218 in the example shown. Stator sleeve 152 is disposed radially within sleeve support body 162. In the example shown, the exterior surface of stator sleeve 152 interfaces with the interior surface of stator case 150. Specifically, stator sleeve 152 interfaces with the inner radial surface of sleeve support body 162. Stator sleeve 152 also axially interfaces with case body 156, as discussed in more detail below. In the example shown, stator sleeve 152 projects in first axial direction AD1 out of sleeve support body 162. Stator sleeve 152 does not project out of sleeve support body 162 and into end projection 164 in the examples shown.

Stator case 150 is disposed radially within motor 122. At least a portion of case body 156 radially overlaps with motor stator 140. At least a portion of case body 156 radially overlaps with motor rotor 142. In the example shown, sleeve support body 162 is disposed radially within motor 122. In the example shown, case body 156 extends fully axially through motor 122. In the example shown, case body 156 extends fully axially through motor housing 106 such that case body 156 projects axially through both end plate 112a and end plate 112b. Case body 156 extends fully axially through motor 122 such that all electromagnetic components of motor stator 140 radially overlap with case body 156. The full axial length of motor stator 140 radially overlaps with a portion of case body 156 in the example shown. Case body 156 extends through motor 122 such that a full axial length of the magnetic array 146 radially overlaps with stator case 150.

Case body 156 extends through motor 122 and is at least partially disposed within outer drive 128. Case body 156 projects out of one axial end of outer drive 128. Case body 156 projects axially out of outer drive 128 in second axial direction AD2. Case end 154b is disposed axially outside of outer drive 128 while case end 154a is disposed axially within outer drive 128. Case body 156 does not project fully axially through outer drive 128 in the example shown. Case body 156 extends into outer drive 128 and motor 122 such that case body 156 radially overlaps with rotating components of outer drive 128 and radially overlaps with electromagnetic components of motor 122. Case body 156 being at least partially disposed radially within outer drive 128 facilitates a compact pumping arrangement. In the example shown, case body 156 extends fully axially through motor 122. Case body 156 does not project fully axially through outer drive 128, but case body 156 does projects axially outward beyond both axial ends of motor rotor body 144. The radial overlap between stator case 150 and motor 122 provides a compact pumping arrangement that significantly reduces the overall length of pump 100 as compared to traditional rotor-stator pumps.

Stator case 150 extends through motor 122 but does not contact motor stator 140 or motor rotor 142, in the example shown. At least a portion of stator case 150 is disposed directly radially inside of motor rotor 142. Radial gap 216 is formed between the inner radial surface of motor rotor body 144 and the outer radial side of case body 156. Radial gap 216 is an air gap between outer drive 128 and stator case 150. Radial gap 216 is an air gap between motor rotor 142 and stator case 150. Radial gap 216 can extend fully annularly about stator case 150. Radial gap 216 can be formed as a cylindrical air gap, among other options. Motor rotor 142 rotates relative to and about stator case 150 and motor rotor 142 is prevented from contacting stator case 150 by radial gap 216 formed therebetween. Radial gap 216 further inhibits heat transfer to motor 122 and pump housing 110. The radial gap 216 is an air gap that inhibits thermal transfer across the radial gap 216. The heat generated during pumping, such as by helical rotor rod 124 moving relative to and within stator sleeve 152, is instead carried by the pumped material out of pump 100.

A motor air gap 217 is formed within motor 122 between motor rotor 142 and motor stator 140. The electromagnetic flux generated by motor stator 140 interacts with the magnetic flux of magnetic array 146 in the motor air gap 217. The motor air gap 217 is disposed radially between motor stator 140 and motor rotor 142. Pump stator 126 is disposed radially inward of multiple air gaps (radial gap 216 and motor air gap 217). Electromagnetic flux acts on magnetic array 146 across motor air gap 217 but no driving flux interaction occurs in radial gap 216. Flux interaction that drives rotation occurs in only one of the two air gaps radially outward of pump stator 126. In the example shown, radial gap 216 is concentric with motor air gap 217. Radial gap 216 is disposed radially inward of motor air gap 217. In the example shown, pump 100 is configured such that radial gap 216 is disposed within and radially overlaps with motor air gap 217.

In the example shown, pump 100 includes only a single magnetic array. Pump 100 does not include multiple magnetic arrays that interact. Instead, motor stator 140 generates electromagnetic fields that interact with the single magnetic array 146 of motor rotor 142. There are no magnets that define radial gap 216. Magnetic array 146 does at least partially define motor air gap 217.

In the example shown, stator case 150 is mounted to pump body 104. More specifically, stator case 150 is connected to the portion of pump body 104 forming motor housing 106. In the example shown, stator case 150 is fixed to end plate 112b of pump body 104. Stator case 150 is connected to pump body 104 by fasteners extending through stator case 150 and into pump body 104. In the example shown, the fasteners extend through case flange 158 of stator case 150. Case flange 158 projects radially outward from case body 156. In the example shown, case flange 158 is disposed at case end 154b of case body 156. Case flange 158 can be formed as an annular flange extending fully around pump axis AA or as a series of tabs arrayed circumferentially about pump axis AA, among other options. Case flange 158 is connected to pump body 104 at a downstream end of stator case 150, in the example shown. The case flange 158 is disposed at an opposite axial end of stator case 150 from case opening 166a through which material enters stator case 150. In the example shown, case flange 158 projects radially outwards from case body 156 such that case flange 158 axially overlaps with a portion of motor 122. In the example shown, case flange 158 axially overlaps with motor rotor 142. In the example shown, a portion of case flange 158 extends to axially overlap with magnetic array 146.

Locating shoulder 224 extends radially outward from case body 156. Locating shoulder 224 is disposed adjacent to case flange 158 and, in some examples, can be considered to be formed by a portion of case flange 158. Locating shoulder 224 is disposed within locating opening 226 formed through end plate 112b. Case body 156 extends through locating opening 226 such that stator case 150 extends fully axially through end plate 112b. Locating shoulder 224 has a larger diameter than sleeve support body 162 and is configured to fit withing locating opening 226. Locating shoulder 224 extending into locating opening 226 assists in aligning stator case 150, and thus pump stator 126, on pump axis AA. In some examples, the exterior radial surface of locating shoulder 224 is faceted and the interior radial surface of end plate 112b defining locating opening 226 is complementarily faceted to mate with the faceted locating shoulder 224. Such mating faceting inhibits rotation of stator case 150 during operation.

Case body 156 extends in second axial direction AD2 from case end 154b to case end 154a. Case body 156 can be considered to extend axially from case flange 158. Case body 156 forms a hollow tube structure that accepts stator sleeve 152. In the example shown, case body 156 defines a multi-diameter bore that forms sleeve cavity 218. Stator sleeve 152 is disposed in the larger diameter portion of the bore. The larger diameter portion that receives stator sleeve 152 is formed by sleeve support body 162 and the smaller diameter portion is formed by end projection 164.

Brace shoulder 160 extends radially inward and is formed axially between case end 154a and case end 154b. Brace shoulder 160 is disposed at an intersection between the smaller diameter end projection 164 of case body 156 and the larger diameter sleeve support body 162 of case body 156. Brace shoulder 160 extends radially inward to axially overlap with stator sleeve 152. Brace shoulder 160 is configured to interface with an axial end of stator sleeve 152 to brace stator sleeve 152 and inhibit movement of stator sleeve 152 in second axial direction AD2. Brace shoulder 160 interfacing with stator sleeve 152 forms an annular face seal between the axial end face of stator sleeve 152 and brace shoulder 160.

In the example shown, stator sleeve 152 is clamped axially between end cover 108b and brace shoulder 160 to secure stator sleeve 152. In some examples, the clamping force on stator sleeve 152 prevents stator sleeve 152 from rotating on pump axis AA. In the example shown, case tooth 220 extends axially and interfaces with stator sleeve 152. Case tooth 220 projects axially from brace shoulder 160. Case tooth 220 can be formed as an annular ring or an array of discrete projections. Case tooth 220 is configured to interface with stator sleeve 152 to rotationally lock stator sleeve 152 and prevent rotation of stator sleeve 152 on pump axis AA. Similarly, cap tooth 222 extends axially and interfaces with stator sleeve 152. Cap tooth 222 projects axially from end cover 108b. Cap tooth 222 can be formed as an annular ring or an array of discrete projections. Cap tooth 222 is configured to interface with stator sleeve 152 to rotationally lock stator sleeve 152 and prevent rotation of stator sleeve 152 on pump axis AA. Case tooth 220 extends in first axial direction AD1 towards cap tooth 222 and cap tooth 222 extends in second axial direction AD2 towards case tooth 220. In some examples, case tooth 220 and/or cap tooth 222 can include texturing (e.g., knurled, gear toothed, etc.) oriented axially to engage with stator sleeve 152. Such texturing can enhance the grip on stator sleeve 152 to further inhibit rotation of stator sleeve 152.

End projection 164 is a portion of case body 156 projecting axially away from sleeve support body 162. End projection 164 defines the smaller diameter portion of case body 156. End projection 164 extends axially from brace shoulder 160 in the example shown. Case opening 166a is formed in an axial end of end projection 164 opposite brace shoulder 160. Case opening 166a forms an inlet of the static pump stator 126, in the example shown.

Case opening 166a forms an inlet of pump stator 126 in the example shown. Material enters into static, non-rotating components forming pump stator 126 through case opening 166a. In the example shown, the material initially enters into pump stator 126 at a location spaced axially from pump interface 240. As such, the material flows within the static stator case 150 prior to entering into the pump interface 240 between the rotating helical rotor rod 124 and stator case 150. Flowing the material through the static end projection 164 upstream of the pump interface 240 facilitates efficient pumping by pump 100 as the static stator case 150 does not rotate and thus does not impart and rotational momentum to the material as the material flows to pump interface 240. It is understood, however, that not all examples are so limited.

In the example shown, end projection 164 extends into end adaptor 148 to radially overlap with end adaptor 148. It is understood, however, that not all examples are so limited. Some examples of pump 100 can include a stator case 150 that does not extend into end adaptor 148 to radially overlap with end adaptor 148. Some examples of stator case 150 do not include an end projection 164 that extends into end adaptor 148. In such an example, a sealing interface can be formed between an end face of stator case 150 oriented in second axial direction AD2 and an end face of end adaptor 148 oriented in first axial direction AD1. For example, a dynamic seal can be formed between the axial end face of case body 156 at brace shoulder 160 and the axial end face of axial flange 174 of end adaptor 148.

Stator case 150 is statically held at one end of stator case 150 and is dynamically held at the other end of stator case 150. In the example shown, stator case 150 is statically held on a high pressure, outlet end of stator case 150 and stator case 150 is dynamically held on a low pressure, inlet end of stator case 150. It is understood, however, that not all examples are so limited. For example, stator case 150 can be statically held on the low pressure side and dynamically held on the high pressure side.

Stator case 150 is dynamically supported by bearing 132*c* that is disposed radially between outer drive 128 and stator case 150. In the example shown, bearing 132*c* interfaces with end projection 164 of outer drive and with end projection 164 of stator case 150. Bearing 132*c* facilitates outer drive 128 rotating relative to stator case 150. In the example shown, bearing 132*c* is supported in bearing notch 176 formed on a radially inner surface outer drive 128. In the example shown, bearing notch 176 is formed in adaptor shaft 168 of end adaptor 148. Bearing notch 176 is configured such that end adaptor 148 interfaces with an axial end of bearing 132*c* oriented in second axial direction AD2. Bearing notch 176 is closed in second axial direction AD2 to interface with bearing 132*c*. Bearing 132*c* can locate stator case 150 relative to end adaptor 148, providing concentricity therebetween. Bearing 132*c* can thus assist in aligning helical rotor rod 124 and pump stator 126 for operation. Bearing 132*c* further assists in maintaining radial gap 216 between stator case 150 and motor rotor 142. End adaptor 148 is fixed to motor rotor body 144 such that bearing 132*c* maintaining alignment between end adaptor 148 and stator case 150 further maintains alignment between stator case 150 and motor rotor body 144. Bearing 132*c* can be formed as a sleeve bearing (e.g., formed from brass, plastic, etc.), among other options.

Dynamic seals 136*a*, 136*b* provide sealing between rotating and static components of pump 100. Dynamic seal 136*a* is formed as a seal assembly that includes multiple individual sealing components, in the example shown. In the example shown, dynamic seal 136*a* includes primary seal 228*a* and secondary seal 230*a*. A weep hole is formed through end cover 108*a* at a location axially between the two individual sealing components of dynamic seal 136*a*. The weep hole allows any material that does leak through primary seal 228*a* to exit from end cover 108*a*, providing a visual indication to the user that there is a leak and preventing material migration further into pump 100. While dynamic seal 136*a* is shown as including multiple individual seals, it is understood that not all examples are so limited. For example, dynamic seal 136*a* can include a single sealing element (e.g., primary seal 228*a*) or can include more than two sealing elements.

Dynamic seal 136*b* is formed as a seal assembly that includes multiple individual sealing components, in the example shown. In the example shown, dynamic seal 136*b* includes primary seal 228*b* and secondary seal 230*b*. A weep hole is formed through end adaptor 148 at a location axially between the two individual sealing components of dynamic seal 136*b*. The weep hole allows any material that does leak through primary seal 228*b* to exit from end adaptor 148. While dynamic seal 136*b* is shown as including multiple individual seals, it is understood that not all examples are so limited. For example, dynamic seal 136*b* can include a single sealing element (e.g., primary seal 228*b*) or can include more than two sealing elements.

Dynamic seal 136*a* is disposed between outer drive 128 and end cover 108*a*. In the example shown, dynamic seal 136*a* is disposed radially end adaptor 148 and end cover 108*a*. Specifically, dynamic seal 136*a* is disposed between adaptor head 170 and end cover 108*a*. More specifically, dynamic seal 136*a* is disposed radially between end wall 202 and end cover 108*a*. Dynamic seal 136*a* provides a fluid-tight seal at the interface between the rotating end adaptor 148 and the static end cover 108*a*. In the example shown, dynamic seal 136*a* is supported by seal grooves formed in end cover 108*a* such that dynamic seal 136*a* remains stationary as end adaptor 148 rotates relative to dynamic seal 136*a*. It is understood, however, that not all examples are so limited. Some examples can include dynamic seal 136*a* supported in seal grooves on end adaptor 148 to rotate with end adaptor 148.

Dynamic seal 136*b* interfaces with stator case 150 and outer drive 128 to form a seal between stator case 150 and outer drive 128 that rotates relative to stator case 150. In the example shown, dynamic seal 136*b* is disposed radially between stator case 150 and end adaptor 148. More specifically, dynamic seal 136*b* is disposed between end projection 164 and adaptor shaft 168. Dynamic seal 136*b* provides a fluid-tight seal at the interface between the rotating end adaptor 148 and the static stator case 150. In the example shown, dynamic seal 136*b* is supported by seal grooves formed in end adaptor 148 such that dynamic seal 136*b* rotates with end adaptor 148 and relative to stator case 150 as end adaptor 148 rotates relative to stator case 150. It is understood, however, that not all examples are so limited. Some examples can include dynamic seal 136*b* supported in seal grooves on stator case 150 such that dynamic seal 136*b* remains stationary relative to stator case 150 as end adaptor 148 rotates relative to stator case 150.

Dynamic seal 136*a* and dynamic seal 136*b* are disposed on a low pressure side of pump 100. Dynamic seal 136*a* and dynamic seal 136*b* are both disposed upstream of the pump interface 240 between helical rotor rod 124 and stator sleeve 152. Dynamic seals 136*a*, 136*b* are both spaced in second axial direction AD2 from bearing 132*a*. Dynamic seals 136*a*, 136*b* are both spaced in second axial direction AD2 from bearing 132*b*. Dynamic seals 136*a*, 136*b* are both spaced in second axial direction AD2 from bearing 132*c*. Dynamic seals 136*a*, 136*b* are spaced axially from the various bearings 132*a*-132*c*. Dynamic seals 136*a*, 136*b* are disposed upstream of pump interface 240 between helical rotor rod 124 and stator sleeve 152. Dynamic seals 136*a*, 136*b* being disposed on the upstream, low pressure side of pump 100 provides longer operating life as the pressure generated by pump 100 does not act on dynamic seals 136*a*, 136*b*. In the example shown, pump 100 does not include any dynamic seals downstream of pump interface 240. Pump 100 does not include dynamic seals in high pressure portions of pump 100, which are areas in which helical rotor rod 124 and pump stator 126 have acted on the material to increase a pressure of the material. Having no dynamic seals in the high pressure regions decreases the complexity of pump 100 and removes dynamic seals from areas that are more likely to increase wear on the seals.

Dynamic seals 136*a*, 136*b* are disposed such that the sealing interfaces (between outer drive 128 and end cover 108a for dynamic seal 136a and between outer drive 128 and stator sleeve 152 for dynamic seal 136b) do not need to be broken to access helical rotor rod 124 and stator sleeve 152. Helical rotor rod 124 can be accessed by disconnecting inwardly projecting support 178 from end adaptor 148 and removing drive link 180. Helical rotor rod 124 can then be pulled in second axial direction AD2 and out of stator sleeve 152 for servicing and/or replacement. Stator sleeve 152 can be accessed by disconnecting end cover 108b from pump 100. Stator sleeve 152 can then be pulled in first axial direction AD1 and out of stator case 150 for servicing and/or replacement. The sealing interfaces of dynamic seals 136a, 136b remain intact during removal and/or replacement of helical rotor rod 124 and stator sleeve 152. Disposing dynamic seals 136a, 136b such that components interfacing with the dynamic seals 136a, 136b do not have to move into or out of engagement with the dynamic seal 136a, 136b protects dynamic seals 136a, 136b from possible contact damage that could occur and thus provides a longer useful life for dynamic seals 136a, 136b and a more robust configuration of pump 100.

Motor 122 is disposed radially outward of pump interface 240. Motor 122 is disposed radially outward from helical rotor rod 124 and pump stator 126. In the example shown, pump 100 is configured such that a first rotating component (e.g., helical rotor rod 124) is disposed radially inward of and radially overlaps with a first static component (e.g., pump stator 126), which static component is disposed radially inward of and radially overlaps with a second rotating component (e.g., outer drive 128). In the example shown, a radial line extending from pump axis AA at a location axially within cavity channel 214 extends first through helical rotor rod 124, then through pump stator 126, and then through outer drive 128. The radial line can extend first through helical rotor rod 124, then through pump stator 126, and then through electromagnetic components of motor 122.

In the example shown, pump stator 126 is radially bracketed by rotating components. Outer drive 128 is disposed radially outward of pump stator 126 while helical rotor rod 124 is radially inward of pump stator 126. Pump stator 126 does not directly contact that radially outer rotating component but does contact the radially inner rotating component to pump the material. The configuration of pump 100 facilitates a compact pumping arrangement that reduces the overall axial length of pump 100 and facilitates installation and use in confined areas.

In the example shown, motor 122 radially overlaps with pump stator 126 and helical rotor rod 124. In the example shown, a full axial length of motor 122 radially overlaps with pump stator 126 and with helical rotor rod 124. All magnetic driving components of motor 122 (including windings of motor stator 140 and magnetic array 146 of motor rotor 142) radially overlap with helical rotor rod 124 and pump stator 126 in the example shown. Motor 122 is disposed radially outward of helical rotor rod 124 and pump stator 126. It is understood that in some other examples the motor 122 can be spaced along pump axis AA relative to pump interface 240 such that motor 122 does not radially overlap with either or both of helical rotor rod 124 and pump stator 126 or such that only a portion of motor radially overlaps with helical rotor rod 124 and/or pump stator 126.

During operation, material is received by pump 100 via pump inlet 116 and pump 100 pumps the material through pump channel 138 to pump outlet 118. For example, a hopper (e.g., hopper 102 (FIG. 8A)) can be mounted to pump body 104. The hopper 102 can be mounted to end cover 108a, such as by a clamp interfacing with the hopper 102 and with fitting 114 of end cover 108a. In some examples, pump 100 is configured such that the material is gravity-fed from hopper 102 into pump 100.

The helical rotor rod 124 rotates relative to the pump stator 126 to drive the material through cavity channel 214 of pump stator 126. The rotation of helical rotor rod 124 relative to pump stator 126 creates the series of progressive pockets that pumps the material through pump stator 126 and downstream towards pump outlet 118.

Motor stator 140 receives an electrical input that causes motor stator 140 to generate electromagnetic fields. The electromagnetic fields act on magnetic array 146 of motor rotor 142 to induce rotation of motor rotor 142 on pump axis AA. The magnetic array 146 is connected to motor rotor body 144 such that motor rotor body 144 rotates on pump axis AA. The rotational motion of motor rotor 142 causes rotation of outer drive 128. In the example shown, motor rotor body 144 rotates due to electromagnetic fields generated by motor stator 140 acting on magnetic array 146. Torque is transmitted from motor rotor body 144 to end adaptor 148 by the connection between end adaptor 148 and motor rotor body 144. End adaptor 148 rotates on pump axis AA. Outer drive 128 rotates on pump axis AA and transmits the rotational motion axially outwards from motor 122 in second axial direction AD2. The rotational energy is transmitted in the upstream direction from motor 122, in the example shown. Inner drive 130 is connected to outer drive 128 to be rotated by outer drive 128. In the example shown, end adaptor 148 is the component of outer drive 128 that receives rotational output from motor rotor body 144 and that transmits rotational torque to inner drive 130.

Inner drive 130 extends in first axial direction AD1 towards motor 122. Inner drive 130 extends within outer drive 128 and at least a portion of inner drive 130 radially overlaps with at least a portion of outer drive 128. In the example shown, end adaptor 148 is connected to inner drive 130. End adaptor 148 rotating on pump axis AA transmits rotational motion to inner drive 130 to cause inner drive 130 to rotate on pump axis AA. In the example shown, inwardly projecting support 178 is connected to end adaptor 148 to be rotated by end adaptor 148. The rotating inwardly projecting support 178 extends radially inward from end adaptor 148 towards pump axis AA. Inwardly projecting support 178 transmits torque to drive link 180. Drive link 180 transmits torque to helical rotor rod 124 to cause helical rotor rod 124 to rotate within stator sleeve 152 and relative to stator sleeve 152.

The rotational energy generated by pump 100 originates at motor 122. The rotational energy is transmitted in axial direction AD2 from motor rotor 142 and axially outwards beyond pump stator 126. The rotational energy turns a corner at the interface between outer drive 128 and inner drive, which interface is formed by the connection between end adaptor 148 and inwardly projecting support 178 in the example shown. The rotational energy is transmitted by inner drive 130 back in first axial direction AD1 to helical rotor rod 124 to cause rotation of helical rotor rod 124. The rotational energy is redirected in the opposite axial direction by inner drive 130 at a location spaced axially from the motor 122. The rotational energy is redirected in the opposite axial direction at a location spaced axially from the pump interface 240 between helical rotor rod 124 and pump stator 126. In the example shown, the rotational energy is redirected in the opposite axial direction at the inwardly projecting support 178. Transmitting the torque axially outwards beyond pump interface 240 and then axially back towards pump interface 240 to drive rotation of helical rotor rod 124 at pump interface 240 provides a compact pump 100 that can be utilized in confined spaces. The torque turning a corner and being transmitted back to radially within the static pump stator 126 after being transmitted axially beyond pump stator 126 further assists in alignment of helical rotor rod 124 and pump stator 126 and provides for efficient pumping by pump 100.

Material is fed into pump 100 at pump inlet 116. The material enters into rotating components of pump 100 prior to entering into the cavity channel 214. The material flows into the rotating outer drive 128 through drive opening 198. Specifically, the material flows into adaptor head 170 of end adaptor 148. Dynamic seal 136a prevents the material from flowing along the radial exterior of outer drive 128. Instead, the material must flow into the rotating outer drive 128. The material flows around the rotating inwardly projecting support 178 and drive link 180 as the material flows through end adaptor 148. The material flowing within outer drive 128 encounters sloped wall 200, which narrows the diameter of the passage through end adaptor 148 and funnels the material radially inwards towards pump axis AA.

The material flows into pump stator 126 from outer drive 128. In the example shown, the material initially enters into stator case 150 prior to flowing to cavity channel 214. The material flows into the static stator case 150 from the rotating outer drive 128 prior to flowing to cavity channel 214. The material flows into stator case 150 prior to flowing to the cavity channel 214, in the example shown. Specifically, the material flows into end projection 164 of stator case 150. The material enters into stator case 150 through case opening 166a. Dynamic seal 136b prevents the material from flowing radially between stator case 150 and outer drive 128. Instead, the material must flow into the static stator case 150.

The material flows through the portion of stator case 150 upstream of stator sleeve 152 and to stator sleeve 152. The material enters into stator sleeve 152 from stator case 150. The material flows into stator sleeve 152 at an upstream end of stator sleeve 152 that is oriented in second axial direction AD2. Helical rotor rod 124 rotating relative to stator sleeve 152 creates the series of progressing cavities that drives the material in first axial direction AD1 through cavity channel 214. The material exits cavity channel 214 at a downstream end of stator sleeve 152 and enters into end cover 108b. The material flows over and around stop 134 and to the pump outlet 118 of pump 100.

In the example shown, the material is pumped through motor 122 such that the material moves axially in first axial direction AD1 to radially overlap with motor 122 and then continues downstream beyond motor 122. Pump channel 138 extends fully axially through motor 122 such that the material flows within and through motor 122. The material flows through motor 122 radially inward of the electromagnetic components of motor 122. The material flow radially overlaps with motor stator 140 and motor rotor 142 during at least a portion of the flow through pump 100.

Pump 100 provides significant advantages. The pumping components of pump 100, formed by helical rotor rod 124 and pump stator 126, are disposed radially inward of motor 122. Material flows axially through motor 122 as the material is displaced by the motion of helical rotor rod 124 relative to stator sleeve 152. Such a configuration provides a compact pump 100 that can be utilized in confined area. Pump 100 is more compact and easier to move by the user.

The rotational motion generated by motor 122 to drive rotation of helical rotor rod 124 is transmitted axially in second axial direction AD2 by outer drive 128 to a location spaced axially from pump stator 126 and then transmitted in the opposite first axial direction AD1 by inner drive 130 to drive rotation of helical rotor rod 124. The rotational motion turning a corner facilitates driving helical rotor rod 124 in a static stator sleeve 152 that is disposed radially inward of motor 122. The rotational motion is transmitted axially outward of the static pump stator 126 and then transmitted back within pump stator 126 to drive rotation of helical rotor rod 124. Transmitting the rotational motion axially outwards from motor 122 and then axially back within motor 122 facilitates compact, efficient pumping by pump 100.

Outer drive 128 is a tube that rotates to transmit rotational motion from motor 122 to helical rotor rod 124 and that also defines a flowpath for material to flow to cavity channel 214. Outer drive 128 can form a funnel that directs the material radially inward towards pump axis AA prior to the material entering into cavity channel 214. Helical rotor rod 124 rotates on pump axis AA and funneling the material towards pump axis AA facilitates efficient pumping by directing the material inwards towards pump interface 240 that drives the material.

End adaptor 148 transmits rotational energy to inwardly projecting support 178 that is disposed in the flowpath of the material through pump 100. The inwardly projecting support 178 extends radially inward and is connected to drive link 180 that extends along pump axis AA. The inwardly projecting support 178 is rigidly connected to end adaptor 148 to rotate with end adaptor 148. Drive link 180 interfaces with both inwardly projecting support 178 and helical rotor rod 124 to transmit rotational motion therebetween. However, drive link 180 is not rigidly connected to either inwardly projecting support 178 or helical rotor rod 124. Drive link 180 allows helical rotor rod 124 to orbit on pump axis AA to facilitate efficient pumping by pump 100.

End adaptor 148 is disposed on a low pressure side of cavity channel 214. End adaptor 148 is disposed upstream of cavity channel 214. In the example shown, end adaptor 148 interfaces with dynamic seal 136a and dynamic seal 136b to prevent material leakage out of pump channel 138. Dynamic seals 136a, 136b are disposed upstream of pump interface 240 on a low pressure side of cavity channel 214. Having dynamic seals 136a, 136b on the low pressure side provides less wear on dynamic seals 136a, 136b, facilitating a longer operating life, thereby decreasing maintenance requirements, decreasing downtime, and decreasing costs. The example of pump 100 shown does not include any dynamic seals on the high pressure outlet side of cavity channel 214. Such a configuration decreases maintenance requirements, decreases downtime, and decreases costs.

Pump stator 126 is disposed radially inward of the rotating outer drive 128 and radially outward of the rotating helical rotor rod 124. Stator case 150 is fixed and does not rotate on pump axis AA. The stator case 150 is statically fixed to pump body 104 at a first end of stator case 150 and is dynamically supported by bearing 132c at an opposite end of stator case 150. In the example shown, the stator case 150 is statically held on a high pressure side of pump 100 and is dynamically supported on a low pressure side of pump 100. Having stator case 150 fixed at only one end allows for thermal growth of stator case 150 and simplifies the support configuration of stator case 150. Dynamically supporting stator case 150 on a low pressure side of pump 100 decreases wear on components and provides for improved operating life for pump 100.

The stator case 150 supports stator sleeve 152 that defines cavity channel 214. Stator case 150 is fixed to pump body 104 to not rotate relative to pump body 104. Stator sleeve 152 is clamped between a portion of stator case 150 and end plate 112b to inhibit rotation of stator sleeve 152. Stator sleeve 152 is not fixed to stator case 150, but is instead clamped to prevent rotation of stator sleeve 152. Such a configuration allows stator sleeve 152 to be removed from stator case 150 without manipulating fasteners that connect stator sleeve 152 to stator case 150. In some examples, a projection can extend radially outward from stator sleeve 152 at a location along stator sleeve 152 disposed in the axial gap between end plate 112b and end cover 108b. The projection is configured to come into contact with one of the fasteners securing end cover 108b to end plate 112b to further inhibit rotation in examples in which stator sleeve 152 does begin to rotate during operation.

Figure 11:
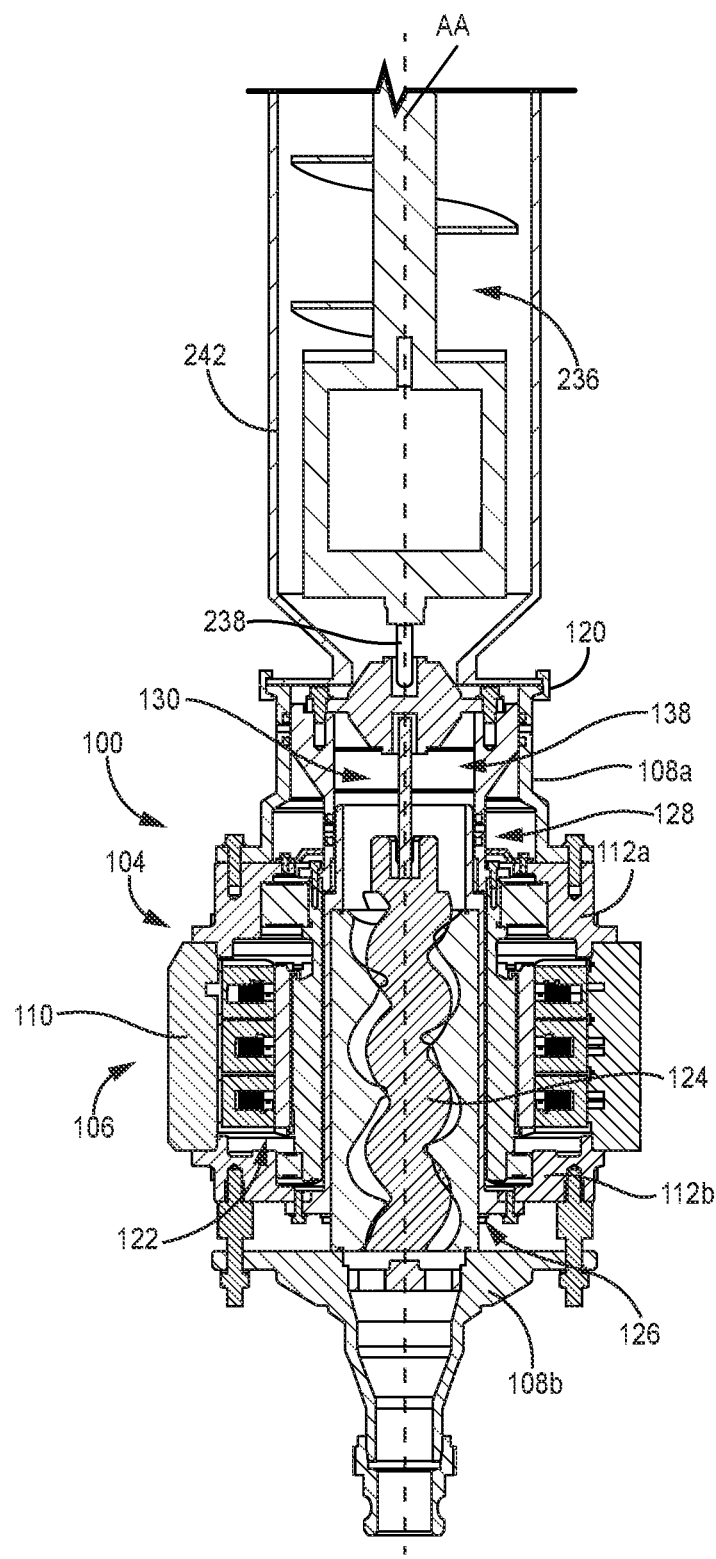
FIG. 11 is a cross-sectional view taken along line B-B in FIG. 9A also showing an agitator assembly.

FIG. 11 is a cross-sectional view taken along line 11-11 in FIG. 8A. The view in FIG. 11 is substantively similar to that shown in FIGS. 9B and 10, except FIG. 11 further illustrates a powered takeoff configuration of pump 100. Agitator 236 and drive shaft 238 of agitator assembly 234 are shown. Many materials that are pumped do not readily flow and need assistance with feeding into the pump inlet 116. This is due in part to rotor stator pumps not developing suction, unlike positive displacement pumps. Gravity is one way to assist with feeding, but still may not be enough for particularly viscous materials or when a horizontal orientation is needed. In such cases, a power feed into the pump inlet 116 may be needed. FIG. 11 shows such a power feed. The power feed can also be referred to as a powered takeoff (PTO).

The power feed is formed by agitator assembly 234 connected to pump 100. Feed housing 242 is mounted to pump body 104. Feed housing 242 can form a hopper that stores a supply of material for pumping by pump 100. For example, feed housing 242 can form or be formed as a portion of hopper 102 (FIG. 8A). Agitator assembly 234 includes agitator 236 that rotates within feed housing 242. The agitator 236 can be formed as an auger and/or stirrer, among other options. The agitator 236 may rotate on pump axis AA. Agitator assembly 234 can be configured to rotate coaxially with outer drive 128. Agitator assembly 234 can be configured to rotate coaxially with motor rotor 142 of motor 122.

Agitator assembly 234 is connected to motor rotor 142 to be rotated by motor rotor 142. In the example shown, agitator 236 is connected to drive shaft 238 to be rotated by drive shaft 238. Drive shaft 238 connects to inner drive 130 to be rotated by inner drive 130. More specifically, drive shaft 238 is connected to inwardly projecting support 178 to be rotated by inwardly projecting support 178. Pump 100 can be considered to provide a common link that transmits rotational energy from motor 122 to both helical rotor rod 124 and agitator 236. The common link can be formed at least partially by outer drive 128 and inner drive 130.

In some examples, drive shaft 238 is configured to connect to a bar receiver 186 of inwardly projecting support 178 (e.g., to the bar receiver 186 not interfacing with drive link 180). In some examples, inwardly projecting support 178 can be configured with two differently configured bar receivers 186. A first one of bar receivers 186 can interface with drive link 180 to drive rotation of drive link 180 while a second one of bar receivers 186 can interface with drive shaft 238 to drive rotation of drive shaft 238. The bar receiver 186 that interfaces with drive shaft 238 can be configured differently from the bar receiver 186 interfacing with drive link 180. The interface between drive shaft 238 and inwardly projecting support 178 can be formed as a rigid connection that does not facilitate orbiting movement, unlike the connection between inwardly projecting support 178 and drive link 180. In some examples, drive shaft 238 can be fixed to inwardly projecting support 178, such as by fasteners among other options, though it is understood that not all examples are so limited.

Drive shaft 238 extends axially from inwardly projecting support 178 in second axial direction AD2. Drive shaft 238 extends axially away from motor 122. Drive shaft 238 extends axially away from pump interface 240. Drive shaft 238 is connected to the rotating inner drive to be rotated by inner drive 130. The inner drive 130 rotates the drive shaft 238 which rotates the agitator 236. In this way, the electric motor 122 rotates the outer drive 128, which outer drive 128 rotates the inner drive 130, which inner drive 130 rotates drive shaft 238, which drive shaft 238 rotates agitator 236.

The supply of power to agitator 236 is not transmitted through helical rotor rod 124. The supply of driving power for both agitator 236 and helical rotor rod 124 are generated by motor 122. The driving power is transmitted through outer drive 128. The driving power is transmitted to inner drive 130 from outer drive 128. From inner drive 130, torque is transmitted in first axial direction AD1 to drive rotation of helical rotor rod 124 and torque is transmitted in second axial direction AD2 to drive rotation or agitator 236. In this way, the drive shaft 238 powers rotation of the agitator 236 instead of the agitator 236 and/or drive shaft 238 being rotated to rotate the helical rotor rod 124. Driving torque for the helical rotor rod 124 is transmitted through outer drive 128 and inner drive 130 but is not transmitted through agitator assembly 234. As such, the drive shaft 238 and/or agitator 236 do not need to be engineered to withstand high rotational loads that power helical rotor rod 124. As such, agitator assembly 234 can be formed from less robust materials (e.g., plastic instead of metals), providing a simpler and less costly powered takeoff for pump 100.

In some examples, the agitator 236 can function to mix the material in some embodiments. For example, in various embodiments, the agitator 236 can function to push material toward the pump stator and pump rotor in the manner of a low pressure pump (i.e. agitator 236) feeding a higher pressure pump.

The present disclosure makes use of multiple embodiments to demonstrate various inventive aspects. The embodiments use similar reference numbers and/or descriptions of the components and aspects. An aspect (material, dimensions, functions, relationship to other aspects, etc.) of a component shown and/or described in connection with one embodiment can be present in a similar component of another embodiment even if not explicitly shown or described for another embodiment, particularly but not exclusively for components of similar reference numbers. For the sake of brevity, such common aspects may not be repeated for each embodiment, but may nevertheless be applicable. Two components that are described (including being claimed) as connected are not necessarily in contact with each other without an intermediary component, unless it is specified that they are directly connected, in which case the two components are in contact with each other. Connected components can be fixed relative to each other such that movement in a first component indirectly or directly drives corresponding movement in a second component to which the first component is connected. Although not necessarily stated, any two components that are contacting in any of the FIGS. can be described (e.g., specifically claimed) as directly connected, and any two components described herein as being connected can be described (e.g., specifically claimed), optionally, as directly connected.

Optional language is used herein describing what "can" or "may" be present, or what "various" embodiment may include, not what is or must necessarily be present. Therefore, if in reference to an embodiment, it is stated that an aspect "may" or "can" be present, then the option can be included, or left out, of the embodiment, particularly in a claim. Each sentence or paragraph can refer to multiple, independent aspects. A claim can be amended with a select word or phrase from a sentence or paragraph without taking the whole sentence or paragraph.

In some examples, the pump rotor can rotate 1:1 with the motor rotor. In some examples, the agitator can rotate 1:1 with the motor rotor and/or the pump rotor.

While the embodiments herein show a motor that directly radially overlaps the pump, in various other embodiments the motor and pump can be positioned coaxial along an axis but at different positions along the axis that do not directly radially overlap.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pump comprising:
   an electric motor including a motor rotor configured to rotate on an axis and a motor stator disposed to electromagnetically drive rotation of the motor rotor;
   a pump stator disposed radially inward of the electric motor; and
   a helical rotor rod disposed at least partially within the pump stator, the helical rotor rod configured to rotate relative to the pump stator to form a series of progressing cavities to drive material along a cavity channel of the pump stator, the helical rotor rod connected to the electric motor to be rotated by the electric motor;
   an outer drive that extends axially outward from the electric motor in a first axial direction along a pump axis, the outer drive configured to rotate on the pump axis; and
   an inner drive connected to the outer drive to be rotated by the outer drive, wherein the inner drive extends in a second axial direction opposite to the first axial direction from the outer drive to the helical rotor rod to connect between the outer drive and the helical rotor rod, the inner drive configured to transmit rotational motion from the outer drive to the helical rotor rod such that the helical rotor rod rotates 1:1 with the motor rotor.

2. The pump of claim 1, wherein the pump stator radially overlaps with at least a portion of the electric motor.

3. The pump of claim 2, wherein the pump stator radially overlaps with all electromagnetic components of the motor stator of the electric motor.

4. The pump of any claim 1, wherein the pump stator extends fully axially through the motor.

5. The pump of claim 1, wherein the helical rotor rod extends fully axially through the motor.

6. The pump of claim 1, wherein a radial line extending from a pump axis of the pump passes through the helical rotor rod, then the pump stator, then the electric motor.

7. The pump of claim 1, wherein:
   the motor rotor is configured to rotate on a pump axis on which the helical rotor rod is configured to rotate; and
   the motor stator disposed around the motor rotor.

8. The pump of claim 7, wherein a rotational output from the motor rotor is transmitted in a first axial direction along the pump axis to a linkage to drive rotation of the linkage, and wherein rotational motion is transmitted from the linkage to the helical rotor rod in a second axial direction along the pump axis, the second axial direction opposite the first axial direction.

9. The pump of claim 8, wherein the linkage is disposed axially outward from the cavity channel.

10. The pump of claim 1, wherein the outer drive is at least partially formed by a motor rotor body of the motor rotor of the electric motor.

11. A pump comprising:
   an electric motor including a motor rotor configured to rotate on an axis and a motor stator disposed to electromagnetically drive rotation of the motor rotor;
   a pump stator disposed radially inward of the electric motor; and
   a helical rotor rod disposed at least partially within the pump stator, the helical rotor rod configured to rotate relative to the pump stator to form a series of progressing cavities to drive material along a cavity channel of the pump stator, the helical rotor rod connected to the electric motor to be rotated by the electric motor;
   an outer drive that extends axially outward from the electric motor in a first axial direction along a pump axis, the outer drive configured to rotate on the pump axis;
   an inner drive connected to the outer drive to be rotated by the outer drive, the inner drive extending in a second axial direction opposite the first axial direction, the inner drive including an inwardly projecting support connected to the outer drive and the inner drive including a drive link extending between the inwardly projecting support and the helical rotor rod;
   wherein the drive link is connected to the inwardly projecting support to rotate with the inwardly projecting support, and wherein the drive link interfaces with one of the inwardly projecting support and the helical rotor rod at a first slotted interface to allow the drive link to rock relative to the at least one of the helical rotor rod and the inwardly projecting support;
   wherein the inner drive is connected to the helical rotor rod to drive rotation of the helical rotor rod.

12. The pump of claim 11, wherein the drive link interfaces with the inwardly projecting support at the first slotted interface, and the drive link interfaces with the helical rotor rod at a second slotted interface.

13. The pump of claim 11, wherein:
   the drive link includes a link body that extends into a first slot and a second slot of the one of the inwardly projecting support and the helical rotor rod at the first slotted interface.

14. The pump of claim 13, wherein the drive link includes a first tab that extends from the link body and into a first recess of the one of the inwardly projecting support and the helical rotor rod.

15. The pump of claim 14, wherein the inwardly projecting support includes the first slot and the second slot, and wherein the drive link body extends into a third slot and a fourth slot of the helical rotor rod to form a second slotted interface.

16. The pump of claim 11, wherein the drive link is at least partially disposed within the inwardly projecting support and the drive link is at least partially disposed in the helical rotor rod.

17. A pump comprising:
a pump body;
an electric motor disposed within the pump body, the electric motor including a motor rotor configured to rotate on an axis and a motor stator disposed around the motor rotor to electromagnetically drive rotation of the motor rotor;
a pump stator disposed radially inward of the electric motor;
a helical rotor rod disposed at least partially within the pump stator, the helical rotor rod configured to rotate relative to the pump stator to form a series of progressing cavities to pump material;
an outer drive extending axially outward from the electric motor in a first axial direction along the axis, the outer drive configured to rotate on the pump axis; and
an inner drive connected to the outer drive at a first interface to be rotated by the outer drive, the inner drive extending in a second axial direction opposite the first axial direction;
wherein the inner drive is connected to the helical rotor rod at a second interface to drive rotation of the helical rotor rod; and
wherein the second interface is spaced from the first interface in the second axial direction.

18. The pump of claim 17, wherein:
the motor rotor is configured to rotate on the pump axis;
the motor stator is disposed around the motor rotor; and
the outer drive is at least partially formed by a motor rotor body of the motor rotor.

19. The pump of claim 17, wherein the pump stator radially overlaps with the electric motor.

20. A pump comprising:
a pump body;
an electric motor disposed within the pump body, the electric motor including a motor rotor configured to rotate on an axis and a motor stator disposed around the motor rotor to electromagnetically drive rotation of the motor rotor;
a pump channel extending through the pump body to define a flowpath for material to flow between the electric motor and between a pump inlet and a pump outlet;
a pump stator disposed radially inward of the electric motor;
a helical rotor rod disposed at least partially within the pump stator, the helical rotor rod configured to rotate relative to the pump stator to form a series of progressing cavities to pump the material;
an outer drive configured to be rotated on the axis by the electric motor; and
an inner drive connected to the outer drive to be rotated by the outer drive, the inner drive connected to the helical rotor rod to drive rotation of the helical rotor rod;
wherein the pump channel extends through the outer drive such that the material flows within the outer drive;
wherein the outer drive includes a drive opening through which the material can enter into the outer drive; and
wherein the outer drive includes a funnel that directs the material inward towards the pump axis, the funnel disposed axially between the drive opening and a pump interface between the helical rotor rod and the pump stator.

* * * * *